United States Patent
Dogome et al.

(10) Patent No.: US 7,019,501 B2
(45) Date of Patent: Mar. 28, 2006

(54) DC/DC CONVERTER

(75) Inventors: Hirofumi Dogome, Kasugai (JP);
Takashi Matsumoto, Kasugai (JP);
Kyuichi Takimoto, Kasugai (JP);
Hidekiyo Ozawa, Kasugai (JP);
Chikara Tsuchiya, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 10/806,150

(22) Filed: Mar. 23, 2004

(65) Prior Publication Data

US 2005/0030777 A1 Feb. 10, 2005

(30) Foreign Application Priority Data

Aug. 8, 2003 (JP) .............................. 2003-290824

(51) Int. Cl.
*G05F 1/40* (2006.01)
(52) U.S. Cl. ..................................... 323/282
(58) Field of Classification Search ................ 323/282, 323/283, 284, 285, 351
See application file for complete search history.

(56) References Cited

U.S. PATENT DOCUMENTS

| | | | |
|---|---|---|---|
| 5,705,919 A | 1/1998 | Wilcox | |
| 5,814,979 A | 9/1998 | Grimm | |
| 6,069,471 A * | 5/2000 | Nguyen | 323/271 |
| 6,304,066 B1 * | 10/2001 | Wilcox et al. | 323/282 |
| 6,320,359 B1 * | 11/2001 | Nagaya et al. | 323/224 |
| 6,430,070 B1 * | 8/2002 | Shi et al. | 363/97 |
| 6,828,764 B1 * | 12/2004 | Takimoto et al. | 323/284 |
| 2004/0124815 A1 * | 7/2004 | Takimoto et al. | 323/282 |

* cited by examiner

Primary Examiner—Adolf Berhane
(74) Attorney, Agent, or Firm—Arent Fox PLLC

(57) ABSTRACT

A DC/DC converter enabling an increase in frequency. The DC/DC converter includes a main transistor, a synchronization transistor, a control circuit, which controls the main transistor and the synchronization transistor, and a capacitor, which is charged to generate gate voltage for the main transistor. The control circuit includes a charging time setting circuit for setting the activation time of the main transistor and the synchronization transistor.

19 Claims, 12 Drawing Sheets

DC/DC CONVERTER

CROSS-REFERENCE TO RELATED APPLICATIONS

This application is based upon and claims the benefit of priority from the prior Japanese Patent Application No. 2003-290824, filed on Aug. 8, 2003, the entire contents of which are incorporated herein by reference.

BACKGROUND OF THE INVENTION

The present invention relates to a DC/DC converter, and more particularly, to a synchronous rectification type DC/DC converter, a semiconductor device functioning as a DC/DC converter, and an electronic device and a battery pack, which incorporate a DC/DC converter.

A portable electronic device, such as a notebook personal computer, a personal digital assistant (PDA), and a cellular phone handset, is provided with a battery, which functions as a power source. Further, a portable electronic device incorporates a DC/DC converter for charging the battery with power supplied from an external power source, such as an AC adapter. The DC/DC converter alternately activates a main transistor and a synchronization transistor, which are connected in series, to supply a load mounted in the electronic device with constant voltage. These electronic devices now have increased performance even though they have become more compact in size. Thus, there is a demand for a more compact DC/DC converter.

FIG. 1 shows an example of a synchronous rectification type DC/DC converter 1 in the prior art. The DC/DC converter 1 includes a control circuit 2, a main transistor T1, and a synchronization transistor T2, which are all configured on the same chip of a semiconductor integrated circuit substrate. The main and synchronization transistors T1 and T2 are N-type MOS-FETs controlled by the control circuit 2.

The control circuit 2 provides the gate of the main transistor T1 with a first drive signal SG1 and the gate of the synchronization transistor T2 with a second drive signal SG2. The main transistor T1 functions as a main switch that drives a load mounted on the electronic device. The drain of the transistor T1 is supplied with voltage Vi from an AC adapter (not shown). The source of the transistor T1 is connected to the drain of the synchronization transistor T2.

The source of the synchronization transistor T2 is connected to ground GND.

Further, the source of the main transistor T1 is connected to an output terminal 3 via a choke coil L1 and a resistor R1, which configure a smoothing circuit. The source of the main transistor T1 is connected to the cathode of a flyback diode D1. The anode of the flyback diode D1 is connected to ground GND.

The node between the choke coil L1 and the resistor R1 is connected to ground GND via a smoothing capacitor C1, which configures a smoothing circuit. The output terminal 3 is connected to a battery BT, which is attached to the electronic device. The output terminal 3 is connected to an internal circuit (not shown), which is configured by a central processing unit (CPU) installed in the electronic device. The DC/DC converter 1 outputs an output voltage Vo from the output terminal 3. Resistors R2 and R3 divide the output voltage Vo to generate divisional voltage V2 and return the divisional voltage V2 to the control circuit 2.

The control circuit 2 includes an error amplification circuit 11, a PWM comparison circuit 12, a triangular wave oscillation circuit 13, a pause period setting circuit 14, a first output circuit 15, a second output circuit 16, and a regulator 17. The control circuit 2 sets the pulse widths of the first and second drive signals SG1 and SG2 in accordance with the difference between the divisional voltage V2 and the reference voltage Vr. Then, in the control circuit 2, the first output circuit 15 provides the main transistor T1 with the first drive signal SG1, and the second output circuit 16 provides the synchronization transistor T2 with the second drive signal SG2. As a result, the control circuit 2 alternately activates the main transistor T1 and the synchronization transistor T2 with predetermined frequencies. In this manner, the DC/DC converter 1 controls the main transistor T1 and the synchronization transistor T2 so that the output voltage Vo is maintained at a constant level.

In the DC-DC converter 1, a bootstrap decreases the ON resistance of the main transistor T1 and improves the energy converting efficiency.

More specifically, the DC/DC converter 1 includes a boot capacitor C2. The boot capacitor C2 is connected between a node N1, of the main transistor T1 and the synchronization transistor T2, and the cathode of a diode D2. The anode of the diode D2 is connected to an output terminal of a regulator 17, which is arranged in the control circuit 2. Further, the anode of the diode D2 is connected to the ground via a capacitor C3. The cathode of the diode D2 is connected to a power supply terminal of the first output circuit 15. The regulator 17 generates regulator output voltage Vb from the input voltage Vi and supplies the regulator output voltage Vb to the second output circuit 16.

If the main transistor T1 is inactivated when the synchronization transistor T2 is activated, the main transistor T1 has a source potential that is the ground potential. In this state, current flows from the regulator 17 to the capacitor C2 via the diode D2. Thus, the capacitor C2 is charged until the voltage of the capacitor C2 is equalized with the regulator output voltage Vb. The first output circuit 15 then uses the charge voltage of the capacitor C2 to provide the gate of the main transistor T1 with the drive signal SG1. This activates the main transistor T.

When the main transistor T1 is activated, the source potential of the transistor T1 increases to the input voltage Vi. In this state, the capacitor C2 is connected to the source of the transistor T1. Thus, voltage Vs supplied to the first output circuit 15 from the capacitor C2 increases until it becomes higher than the input voltage Vi (Vs=Vi+Vb).

Accordingly, the first output circuit 15 uses the voltage (Vi+Vb), which has been increased by the bootstrap, to provide the gate of the main transistor T1 with the drive signal SG1. In this manner, the increased voltage (Vi+Vb) activates the main transistor T1. Thus, the ON resistance of the main transistor T1 is relatively small.

SUMMARY OF THE INVENTION

The DC/DC converter 1, which uses the bootstrap, charges the capacitor C2 when the main transistor T1 is inactivated. By charging the capacitor C2, the DC/DC converter 1 generates the voltage supplied to the gate of the main transistor T1. Therefore, the capacitor C2 is not sufficiently charged if the ON duty ratio of the main transistor T1 (the ratio of the period during which the transistor is active, that is, the ratio of the pulse width of ON pulses in a single cycle of the first drive signal SG1) is high (close to "1"). This would decrease the voltage Vs supplied to the first output circuit 15. Thus, the ON resistance increases and efficiency decreases in the main transistor T1.

U.S. Pat. Nos. 5,705,919 and 5,814,979 describe DC/DC converters that solve the problems described above. In the DC/DC converters, the time toffmin required for charging a boot capacitor is set. The operation frequency (the frequency of a triangular wave signal output from an oscillator) decreases when the ON duty ratio becomes high and the time toffmin thus cannot be ensured.

In the prior art DC/DC converters described in the above two publications, the electrical characteristics of externally connected devices is determined by the operation frequency. For example, the electrical characteristic of a choke coil (externally connected device) forming a smoothing circuit must be set to be applicable for a low operation frequency. This deviates the electrical characteristic from the optimal value at a high frequency and decreases efficiency. Accordingly, with this technique it is difficult to increase the frequency.

The present invention provides a DC/DC converter that enables an increase in frequency.

The present invention provides a synchronous rectification type DC/DC converter including a main transistor and a synchronization transistor connected in series to the main transistor. A control circuit, connected to the main transistor and the synchronization transistor, alternately activates the main transistor and the synchronization transistor for a predetermined activation time. A capacitor, connected to the control circuit and charged when the synchronization transistor is activated, supplies the control circuit with charge voltage used to activate the main transistor. The control circuit includes a charging time setting circuit for setting the predetermined activation time of the main transistor and the synchronization transistor.

Another aspect of the present invention is a synchronous rectification type DC/DC converter including a main transistor and a synchronization transistor connected in series to the main transistor. A control circuit, connected to the main transistor and the synchronization transistor, alternately activates the main transistor and the synchronization transistor for a predetermined activation time. A first capacitor, connected to the control circuit and charged when the synchronization transistor is activated, supplies the control circuit with charge voltage used to activate the main transistor. A second capacitor is connected in series to the first capacitor. The DC/DC converter generates output voltage in accordance with voltage generated by the activation and inactivation of the main transistor and the synchronization transistor. The control circuit includes an error amplification circuit for comparing the output voltage of the DC/DC converter with a reference voltage to generate an error signal. A comparison circuit, connected to the error amplification circuit, compares the error signal with a triangular wave signal to generate a comparison pulse signal having a pulse width that is in accordance with the comparison. A pause period setting circuit, connected to the comparison circuit, generates a first control signal and a second control signal in accordance with the comparison pulse signal of the comparison circuit so that the main transistor and the synchronization transistor are both inactivated during a predetermined period. A first output circuit, connected to the pause period setting circuit and the main transistor, generates a first drive signal, provided to the main transistor, with the first control signal. A second output circuit, connected to the pause period setting circuit and the synchronization transistor, generates a second drive signal, provided to the synchronization transistor, with the second control signal. A signal synthesizing circuit, connected to the pause period setting circuit, synthesizes the first control signal with a reference pulse signal to generate a synthesized signal. A third output circuit, connected to the signal synthesizing circuit, pumps the second capacitor in accordance with the synthesized signal of the signal synthesizing circuit.

A further aspect of the present invention is a synchronous rectification type DC/DC converter including a main transistor and a synchronization transistor connected in series to the main transistor. A first output circuit, connected to the main transistor, generates a first drive signal to drive the main transistor in accordance with the synthesized signal. The first output circuit has a power supply terminal. A second output circuit, connected to the synchronization transistor, generates a second drive signal to drive the synchronization transistor in accordance with the synthesized signal. A capacitor is connected to the power supply terminal of the first output circuit and to a node between the main transistor and the synchronization transistor. An error amplification circuit compares the output voltage of the DC/DC converter with a reference voltage to generate an error signal. A comparison circuit, connected to the error amplification circuit, compares the error signal with a triangular wave signal to generate a comparison pulse signal having a pulse width that is in accordance with the comparison. A pulse generation circuit generates a one shot pulse signal at a predetermined time interval. A pulse width setting circuit, connected to the pulse generation circuit, generates a setting pulse signal having a pulse width that is in accordance with the time the capacitor is charged by using the one shot pulse signal generated by the pulse generation circuit. A signal synthesizing circuit, connected to the comparison circuit and the pulse width setting circuit, generates the synthesized signal by synthesizing the comparison pulse signal of the comparison circuit with the setting pulse signal of the pulse width setting circuit.

A further aspect of the present invention is a semiconductor device incorporating a DC/DC converter. The DC/DC converter includes a main transistor and a synchronization transistor connected in series to the main transistor. A control circuit, connected to the main transistor and the synchronization transistor, alternately activates the main transistor and the synchronization transistor for a predetermined activation time. A capacitor, connected to the control circuit and charged when the synchronization transistor is activated, supplies the control circuit with charge voltage used to activate the main transistor. The control circuit includes a charging time setting circuit for setting the predetermined activation time of the main transistor and the synchronization transistor.

A further aspect of the present invention is a semiconductor device incorporating a DC/DC converter. The DC/DC converter includes a main transistor and a synchronization transistor connected in series to the main transistor. A control circuit, connected to the main transistor and the synchronization transistor, alternately activates the main transistor and the synchronization transistor for a predetermined activation time. A first capacitor, connected to the control circuit and charged when the synchronization transistor is activated, supplies the control circuit with charge voltage used to activate the main transistor. A second capacitor is connected in series to the first capacitor. The DC/DC converter generates output voltage in accordance with voltage generated by the activation and inactivation of the main transistor and the synchronization transistor. The control circuit includes an error amplification circuit for comparing the output voltage of the DC/DC converter with a reference voltage to generate an error signal. A comparison circuit, connected to the error amplification circuit, compares the error signal with a triangular wave signal to generate a comparison pulse signal having a pulse width that is in accordance with the comparison. A pause period setting circuit, connected to the comparison circuit, generates a first control signal and a second control signal in accordance with the comparison pulse signal of the comparison circuit so that the main transistor and the synchronization transistor are both inactivated during a predetermined period. A first output circuit, connected to the pause period setting circuit and the main transistor, generates a first drive signal, provided to the main transistor, with the first control signal. A second output circuit, connected to the pause period setting circuit and the synchronization transistor, generates a second drive signal, provided to the synchronization transistor, with the second control signal. A signal synthesizing circuit, connected to the pause period setting circuit, generates a synthesized signal by synthesizing the first control signal with a reference pulse signal. A third output circuit, connected to the signal synthesizing circuit, pumps the second capacitor in accordance with the synthesized signal of the signal synthesizing circuit.

A further aspect of the present invention is an electronic device incorporating a DC/DC converter. The DC/DC converter includes main transistor and a synchronization transistor connected in series to the main transistor. A control circuit, connected to the main transistor and the synchronization transistor, alternately activates the main transistor and the synchronization transistor for a predetermined activation time. A capacitor, connected to the control circuit and charged when the synchronization transistor is activated, supplies the control circuit with charge voltage used to activate the main transistor. The control circuit includes a charging time setting circuit for setting the predetermined activation time of the main transistor and the synchronization transistor.

A further aspect of the present invention is a battery pack for functioning as a power supply of a device. The battery pack includes a DC/DC converter for generating charge voltage. A battery is connected to the DC/DC converter and charged by the charge voltage supplied from the DC/DC converter. The DC/DC converter includes a main transistor and a synchronization transistor connected in series to the main transistor. A control circuit, connected to the main transistor and the synchronization transistor, alternately activates the main transistor and the synchronization transistor for a predetermined activation time. A capacitor, connected to the control circuit and charged when the synchronization transistor is activated, supplies the control circuit with charge voltage used to activate the main transistor. The control circuit includes a charging time setting circuit for setting the predetermined activation time of the main transistor and the synchronization transistor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
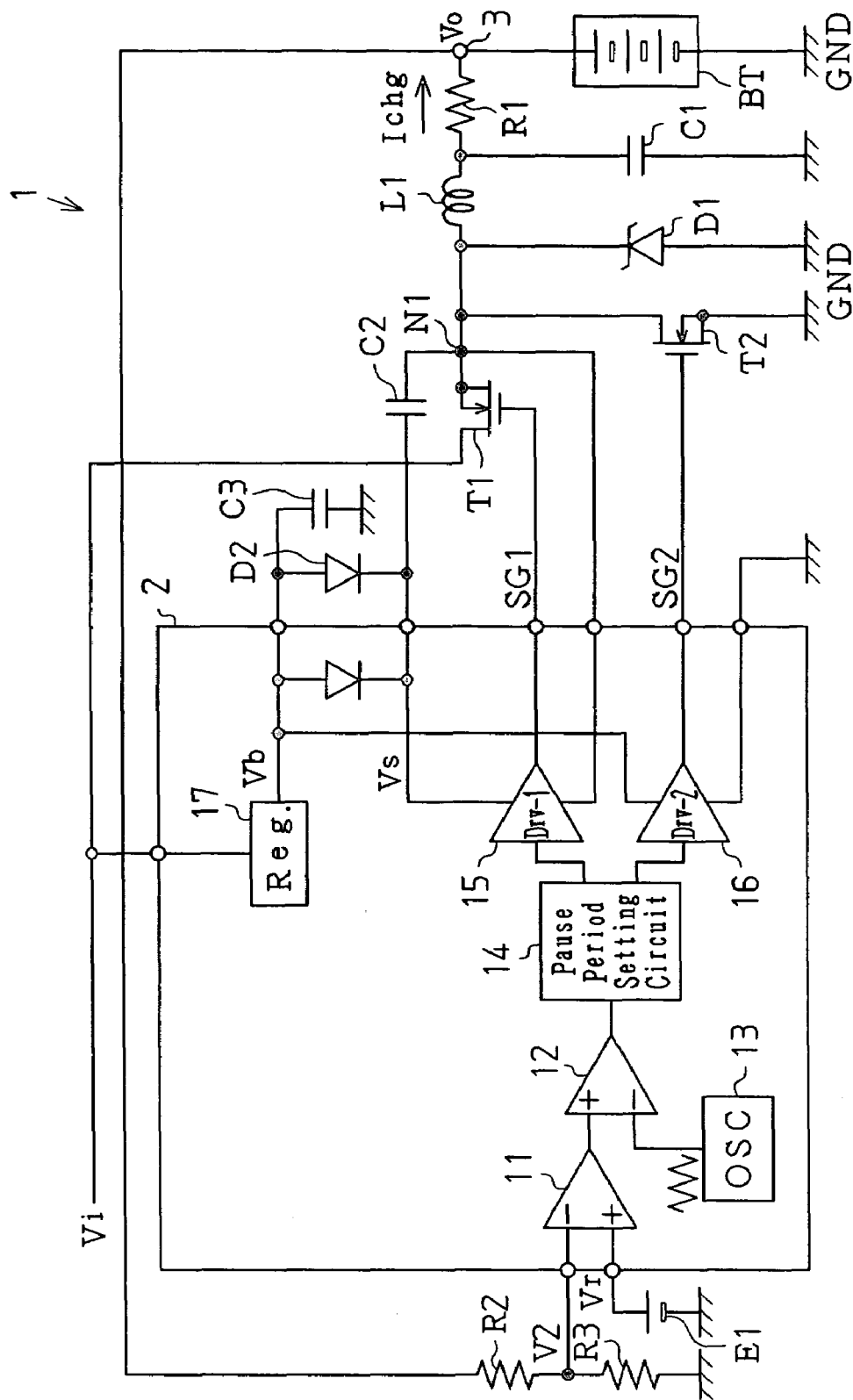
FIG. 1 is a schematic block circuit diagram of a DC/DC converter in the prior art.

In the drawings, like numerals are used for like elements throughout.

[First Embodiment]

An electronic device 21 and a DC/DC converter 32 according to a first embodiment of the present invention will now be discussed with reference to FIGS. 2 to 5.

Figure 5:
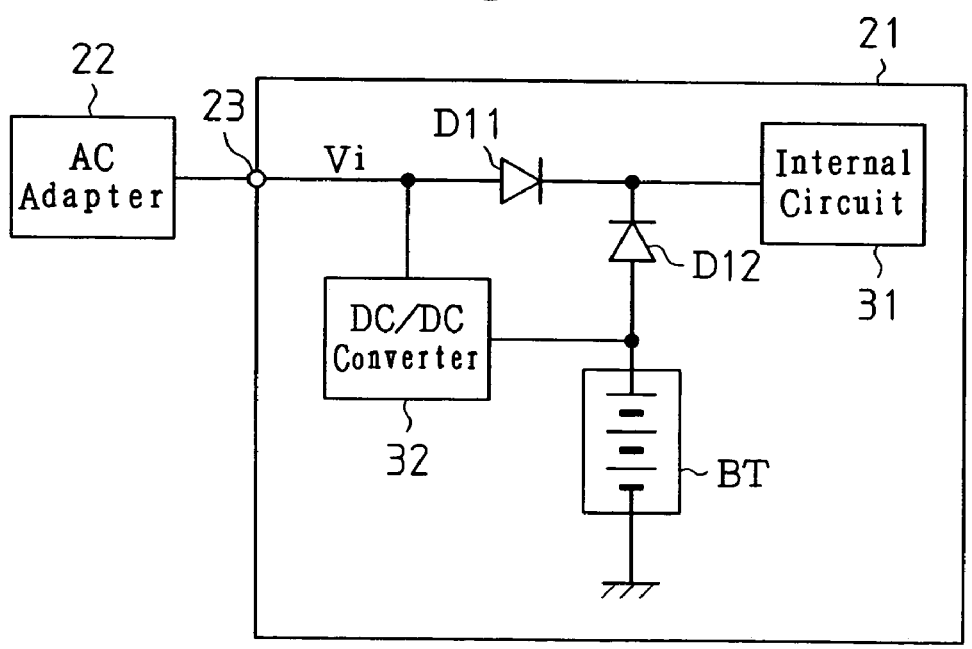
FIG. 5 is a schematic block diagram of an electronic device incorporating the DC/DC converter of FIG. 2.

FIG. 5 is a schematic block diagram of the electronic device 21.

As shown in FIG. 5, the electronic device 21 has a connection terminal 23 connected to the AC adapter 22. The electronic device 21 receives DC voltage Vi from the AC adapter 22 via the connection terminal 23.

The electronic device 21 includes an internal circuit 31 (load), a battery BT, a DC/DC converter (charge circuit) 32, and diodes D11 and D12. The functions of the electronic device 21 are achieved by the internal circuit 31. The internal circuit 31 operates using the DC voltage Vi supplied from the AC adapter 22 as power supply voltage. The battery BT supplies the internal circuit 31 with power when the AC adapter 22 is not connected to the connection terminal 23. The DC/DC converter 32 functions to charge the battery BT.

The connection terminal 23 is connected to the anode of the diode D11. The cathode of the diode D11 is connected to the internal circuit 31. The node between the internal circuit 31 and the diode D1 is connected to the cathode of the diode D12. The anode of the diode D12 is connected to the battery BT. The two diodes D11 and D12 prevent current from flowing in reverse from the internal circuit 31.

The DC/DC converter 32 is supplied with DC voltage Vi from the AC adapter 22. The DC/DC converter 32 is a voltage conversion circuit for generating an output voltage Vo by decreasing (or increasing) the DC voltage Vi. The output voltage Vo generated by the DC/DC converter 32 charges the battery BT.

Figure 2:
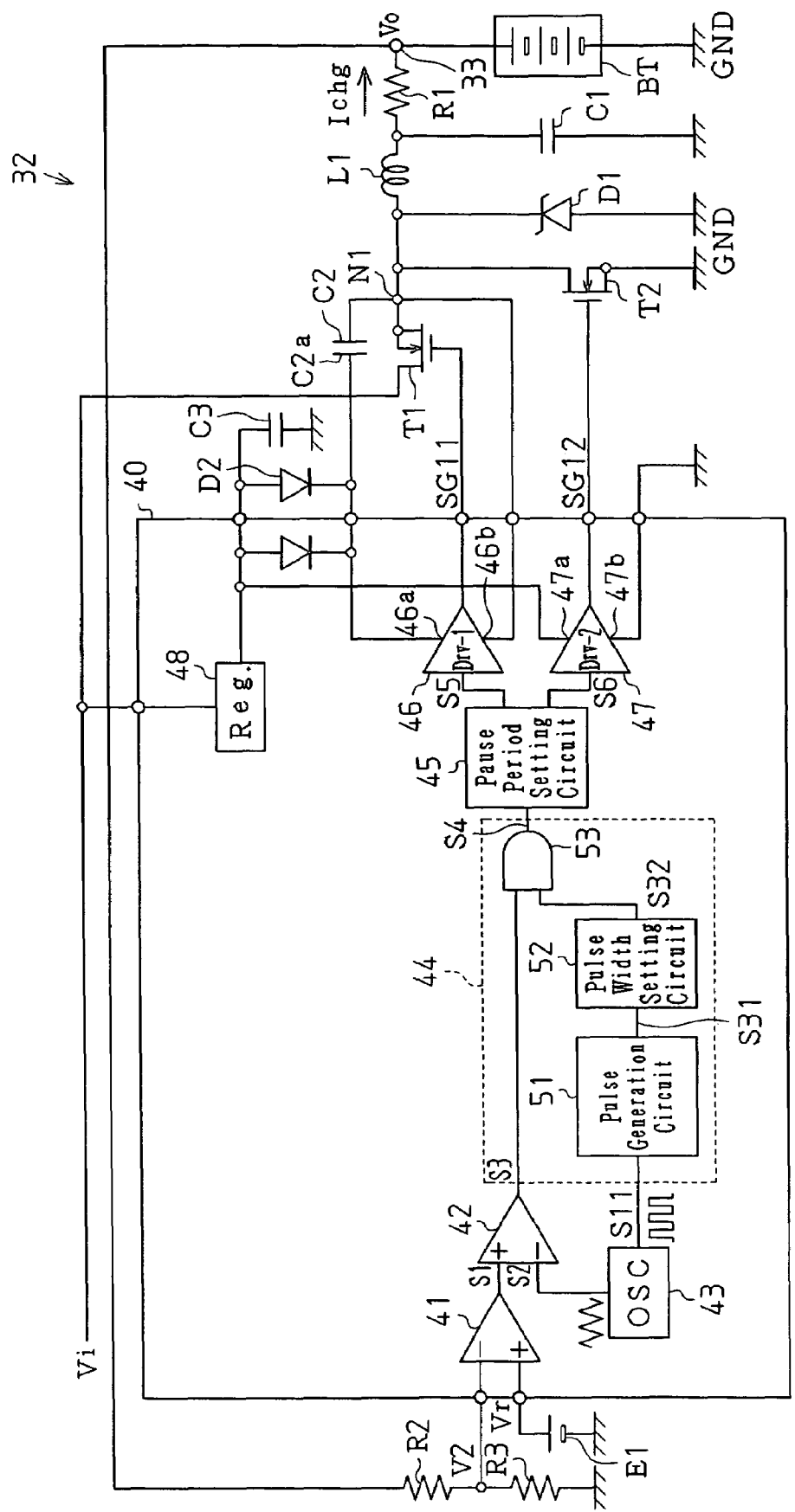
FIG. 2 is a schematic circuit diagram of a DC/DC converter according to a first embodiment of the present invention.

FIG. 2 is a schematic block circuit diagram of the DC/DC converter 32.

The DC/DC converter 32 is a semiconductor device including a control circuit 40, a main transistor T1, and a synchronization transistor T2, all of which are configured on the same chip of a semiconductor integrated circuit substrate.

The transistor T1 is an N-type MOS-FET that functions as a main switch for driving the load of the battery BT or the like. The main transistor T1 is provided with a first drive signal SG11 from a control circuit 40. The drain of the transistor T1 is supplied with the input voltage Vi from the AC adapter 22. The source of the transistor T1 is connected to the drain of the synchronization transistor T2.

The synchronization transistor T2 is an N-type MOS-FET. The synchronization transistor T2 is provided with a second drive signal SG12 from the control circuit 40. The source of the synchronization transistor T2 is connected to ground GND.

Further, the source of the main transistor T1 is connected to an output terminal 33 via a choke coil L1 and a resistor R1, which configure a smoothing circuit. The source of the main transistor T1 is connected to the cathode of the flyback diode D1. The anode of the diode D1 is connected to ground GND.

The node between the choke coil L1 and the resistor R1 is connected to ground GND via a smoothing capacitor C1, which configures a smoothing circuit. The output terminal 33 is connected to the internal circuit 31 via a diode D12, which is shown in FIG. 5. The DC/DC converter 32 outputs the output voltage Vo from the output terminal 33. Resistors R2 and R3 divide the output voltage Vo to generate divisional voltage V2 and return the divisional voltage V2 to the control circuit 40.

The diode D1, the capacitor C1, and the resistors R1, R2, and R3 are also configured on the same chip of a semiconductor integrated circuit substrate. The choke coil L1 is an externally connected device.

The control circuit 40 includes an error amplification circuit 41, a PWM comparison circuit 42, an oscillation circuit 43, a charging time setting circuit 44, a pause period setting circuit 45, a first output circuit 46, a second output circuit 47, and a regulator 48.

The error amplification circuit 41 includes an inverting input terminal for receiving a divisional voltage V2 and a non-inverting input terminal for receiving reference voltage Vr from a reference power supply E1.

The error amplification circuit 41 compares the divisional voltage V2 and the reference voltage Vr to amplify the voltage difference between the two voltages and generate an error signal S1, which is provided to the PWM comparison circuit 42.

The oscillation circuit 43 generates a triangular wave signal S2 and a reference pulse signal S11, which has a predetermined ON duty ratio (e.g., 50%).

The PWM comparison circuit 42 includes a non-inverting input terminal, which receives the error signal S1, and an inverting input terminal, which receives the triangular wave signal S2 from the oscillation circuit 43.

The PWM comparison circuit 42 compares the voltage level of the error signal S1 and the voltage level of the triangular wave signal S2. The PWM comparison circuit 42 generates a pulse signal S3 at a low level when the voltage level of the triangular wave signal S2 is greater than the voltage level of the error signal S1. The PWM comparison circuit 42 generates a pulse signal S3 at a high level when the voltage level of the triangular wave signal S2 is smaller than the voltage level of the error signal S1. The PWM comparison circuit 42 provides the pulse signal S3 to the charging time setting circuit 44.

The charging time setting circuit 44 adjusts the pulse width of the pulse signal S3, to ensure the charging time of the boot capacitor C2, and generates an adjusted pulse signal S4. The charging time setting circuit 44 provides the adjusted pulse signal S4 to the pause period setting circuit 45.

In accordance with the adjusted pulse signal S4, the pause period setting circuit 45 activates and inactivates the main transistor T1 and the synchronization transistor T2 in a complementary manner. The pause period setting circuit 45 also generates first and second control signals S5 and S6 so as to create a period in which the two transistors T1 and T2 are both inactivated (i.e., not activated at the same time). This period is referred to as a synchronous rectification pause period (hereafter simply referred to as pause period). The pause period is set to prevent the system from being damaged. If the main transistor T1 and the synchronization transistor T2 were to be activated simultaneously, excessive direct tunneling current may flow through the two transistors T1 and T2 and damage the system.

The first output circuit 46 amplifies the first control signal S5 from the pause period setting circuit 45 to generate the first drive signal SG11 and provides the first drive signal SG11 to the main transistor T1. The second output circuit 47 amplifies the second control signal S6 from the pause period setting circuit 45 to generate the second drive signal SG12 and provides the second drive signal SG12 to the synchronous transistor T2.

The control circuit 40, which is configured as described above, sets the pulse width of the first and second drive signals SG11 and SG12 in accordance with the difference between the divisional voltage V2 and the reference voltage Vr. In this manner, the control circuit 40 controls the main transistor T1 and the synchronization transistor T2 to alternately activate the main transistor T1 and the synchronization transistor T2 at a predetermined frequency. Through this control, the DC/DC converter 32 maintains the output voltage Vo at a substantially constant level. Further, the DC/DC converter 32 operates the synchronization transistor T2 to perform flyback operation. This decreases energy loss of the flyback diode D1.

The boot capacitor C2 has a first terminal C2a connected to the cathode of a diode D2 and a second terminal connected to the node N1 between the main transistor T1 and the synchronization transistor T2. The anode of the diode D2 is connected to the output terminal of the regulator 48, which is arranged in the control circuit 40. Further, the anode of the diode D2 is connected to the ground via a capacitor C3. The first output circuit 46 includes a high potential power supply terminal 46a, which is connected to the cathode of the diode D2, and a low potential power supply terminal 46b, which is connected to the node N1. The second output circuit 47 includes a high potential power supply terminal 47a, which receives regulator output voltage Vb from the regulator 48, and a low potential power supply terminal 47b, which is connected to ground GND.

If the main transistor T1 is inactivated when the synchronization transistor T2 is activated, the source potential of the main transistor T1 is the ground potential. In this state, current flows from the regulator 48 to the capacitor C2 via the diode D2. Accordingly, the capacitor C2 is charged until the voltage Vs at the terminal C2a of the capacitor C2 is equalized with the regulator output voltage Vb.

Then, the synchronization transistor T2 is inactivated, and the first drive signal SG11 from the first output circuit 46 activates the main transistor T1. This increases the source potential of the transistor T1 to the input voltage Vi. In addition, the voltage Vs at the second terminal C2a of the capacitor C2 becomes greater than the regulator output voltage Vb (Vs=Vb+Vi). The increased voltage Vs is provided to the high potential power supply terminal 46a of the first output circuit 46. The low potential power supply terminal 46b of the first output circuit 46 is connected to the node N1. Accordingly, the first output circuit 46 is operated using the voltage Vs and the input voltage Vi as power supply voltage and provides the gate of the main transistor T1 with the first drive signal SG11 having the level of the voltage Vs (Vb+Vi). In this manner, the gate of the main transistor T1 receives the voltage Vs (Vb+Vi), which has been increased by a bootstrap. Thus, the ON resistance of the main transistor T1 is small.

The diode D2 functions as a reversed flow prevention circuit, which prevents the charge of the capacitor C2 from flowing in reverse to the regulator 48 when the voltage at the terminal C2a of the capacitor C2 is greater than the output voltage Vb of the regulator 48.

The charging time setting circuit 44 will now be discussed in detail.

The charging time setting circuit 44 is arranged in the control circuit 40 to ensure the charging time of the boot capacitor C2.

The charging time of the capacitor C2 is sufficiently ensured when the ON duty ratio of the first drive signal SG11 is relatively small. Sufficient charging time boots the increased voltage Vs to a desired voltage. The first output circuit 46, which receives the increased voltage Vs, provides the gate of the main transistor T1 with the first drive signal SG11 having a level of the increased voltage Vs to activate the main transistor T1. In this state, the gate voltage (Vs) is sufficiently greater than the voltage (Vi) in the main transistor T1. Accordingly, the ON resistance of the main transistor T1 is relatively small.

When the ON duty ratio of the first drive signal SG11 is relatively large, the charging time of the capacitor C2 is insufficient. In this case, the increased voltage Vs is not booted to the desired voltage. Accordingly, the voltage of the first drive signal SG11 provided to the gate of the main transistor T1 becomes lower than the desired voltage. Thus, the ON resistance of the main transistor T1 is relatively large and efficiency is decreased.

The charging time setting circuit 44 decreases the pulse width (ON duty width) of the first drive signal SG11 that activates the main transistor T1 when the capacitor C2 is not charged to the required voltage. In other words, when the capacitor C2 is not charged to the required voltage, the charging time setting circuit 44 increases the pulse width (ON duty width) of the second drive signal SG12 that activates the synchronization transistor T2. In this manner, the DC/DC converter 32 charges the boot capacitor C2 to the required voltage without changing the oscillation frequency of the oscillation circuit 43.

More specifically, the charging time setting circuit 44 includes a pulse generation circuit 51, a pulse width setting circuit 52, and a signal synthesizing circuit 53.

The pulse generation circuit 51 generates a pulse signal S31 having one pulse for every predetermined number of pulses of the reference pulse signal S11 from the oscillation circuit 43 and provides the pulse signal S31 to the pulse width setting circuit 52. The pulse width setting circuit 52 generates a one shot pulse signal S32 by converting the pulse width of the pulse signal S31 from the pulse generation circuit 51 to a predetermined width and provides the pulse signal S32 to the signal synthesizing circuit 53. The signal synthesizing circuit 53 logically synthesizes the pulse signal S32 from the pulse width setting circuit 52 and the pulse signal S3 from the PWM comparison circuit 42 to generate the adjusted pulse signal S4.

The predetermined number of pulses and the predetermined pulse width described above are set in accordance with the source-gate voltage of the transistor T1 (i.e., charge voltage of the boot capacitor C2).

More specifically, in the first embodiment, the pulse generation circuit 51 is a counter for counting the pulses of the reference pulse signal S11. The pulse generation circuit 51 generates one pulse when the count value of the pulses becomes equal to a set value (the above predetermined number of pulses). The reference pulse signal S11 is used to ensure pulse counting.

Figure 3:
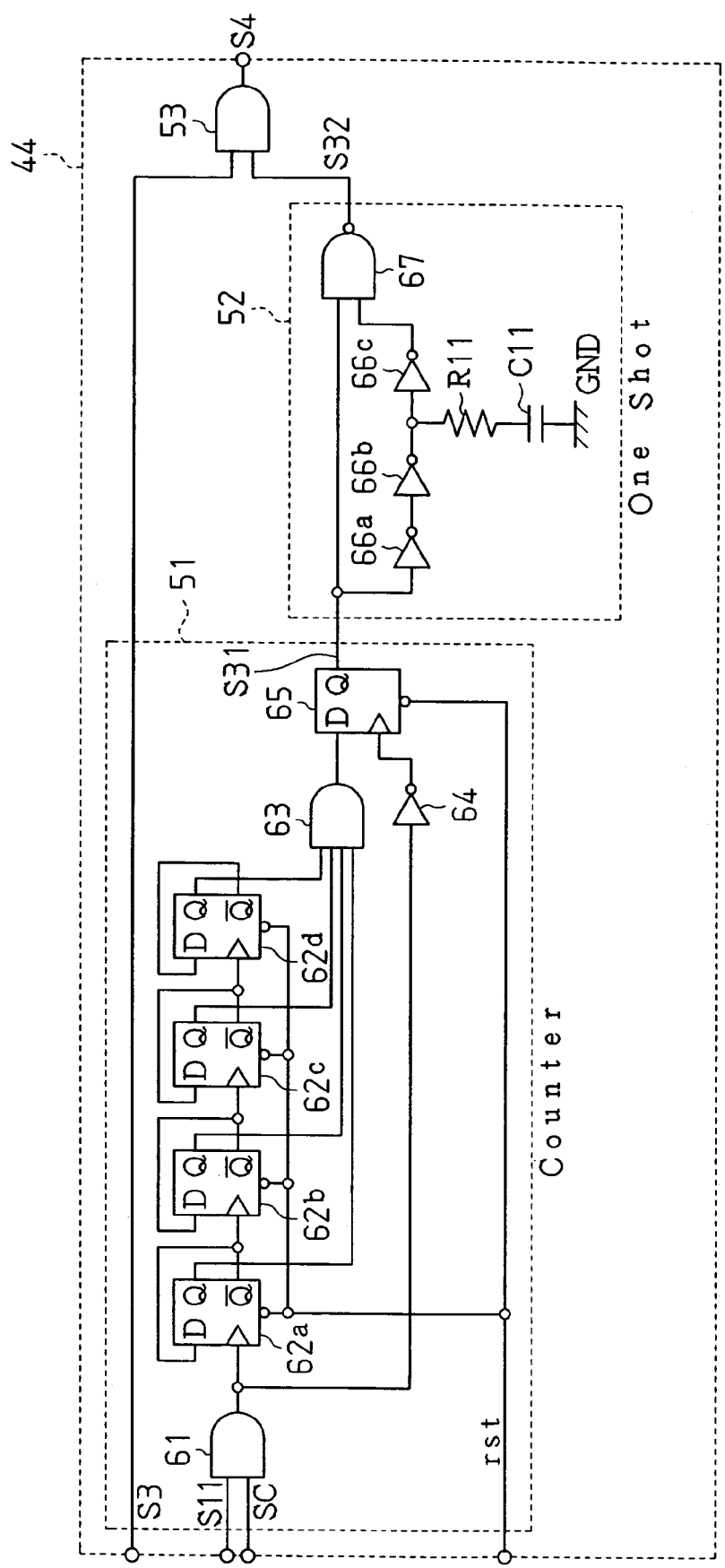
FIG. 3 is a schematic circuit diagram of a charging time setting circuit in the DC/DC converter of FIG. 2.

Referring to FIG. 3, the pulse generation circuit 51 includes an AND circuit 61, plural stages (four stages in FIG. 3) of D-type flip-flop circuits (hereafter referred to as FF circuits) 62a to 62d, an AND circuit 63, an inverter circuit 64, and an FF circuit 65. The AND circuit 61 includes a first input terminal for receiving the reference pulse signal S11 and a second input terminal for receiving the control signal SC. For example, when the internal circuit 31 of the electronic device 21 has not been prepared for operation, the AND circuit 61 is provided with the control signal SC at a low level to stop counting the pulses with the pulse generation circuit 51.

The output terminal of the AND circuit 61 is connected to a clock input terminal of the FF circuit 62a and an input terminal of the inverter circuit 64. In each of the FF circuits 62a to 62d, the inverting output terminal is connected to the data input terminal. Further, in each of the FF circuits 62a to 62c, the inverting output terminal is connected to the clock input terminal of one of the FF circuits 62b to 62d in the next stage.

The AND circuit 63 includes four input terminals, each connected to the non-inverting output terminal of one of the FF circuits 62a to 62d. The output terminal of the AND circuit 63 is connected to the data input terminal of the FF circuit 65. The clock input terminal of the FF circuit 65 is connected to the output terminal of the inverter circuit 64. The reset terminal of each of the FF circuits 62a to 62d and 65 is provided with a reset signal rst. The reset signal rst is, for example, a system reset signal of the electronic device 21. The reset signal rst is used to set the output level of each of the FF circuits 62a to 62d and 65.

The pulse generation circuit 51, which is configured as described above, counts the pulses of the reference pulse signal S11 in response to the control signal SC, which has a high level, and the reset signal rst, which has a high level. The four stages of the FF circuits 62a to 62d counts the pulses of the reference pulse signal S11. The FF circuit 65 provides the pulse signal S31, which has a pulse width equal to one pulse cycle of the reference pulse signal S11, from the non-inverting output terminal to the pulse width setting circuit 52 each time the count value of the pulses of the reference pulse signal 11 matches a set value, which is set by the number of stages of the FF circuits 62a to 62d.

In the first embodiment, the pulse width setting circuit 52 is a one shot circuit. The pulse width setting circuit 52 generates the pulse signal S32 by adjusting the pulse width of the pulse signal S31 to the predetermined pulse width.

The pulse width setting circuit 52 includes an odd number (three in FIG. 3) of inverter circuits 66a to 66c, a NAND circuit 67, a resistor R11, and a capacitor C11. The inverter circuits 66a to 66c are connected in series. The first inverter circuit 66a receives the pulse signal S31. The output terminal of the second inverter circuit 66b is connected to one end of the resistor R11. The other end of the resistor R11 is connected to one end of the capacitor C11. The other end of the capacitor C11 is connected to ground GND. The NAND circuit 67 includes a first input terminal connected to the output terminal of the third inverter circuit 66c and a second input terminal for receiving the pulse signal S31.

The pulse width setting circuit 52, which is configured as described above, generates the pulse signal S32 by converting the pulse width of the pulse signal S31 to the pulse width that is set by the resistor R11 and the capacitor C11. In this manner, the pulse width setting circuit 52 outputs the pulse signal S32 (refer to FIG. 4) from the NAND circuit 67.

Figure 4:
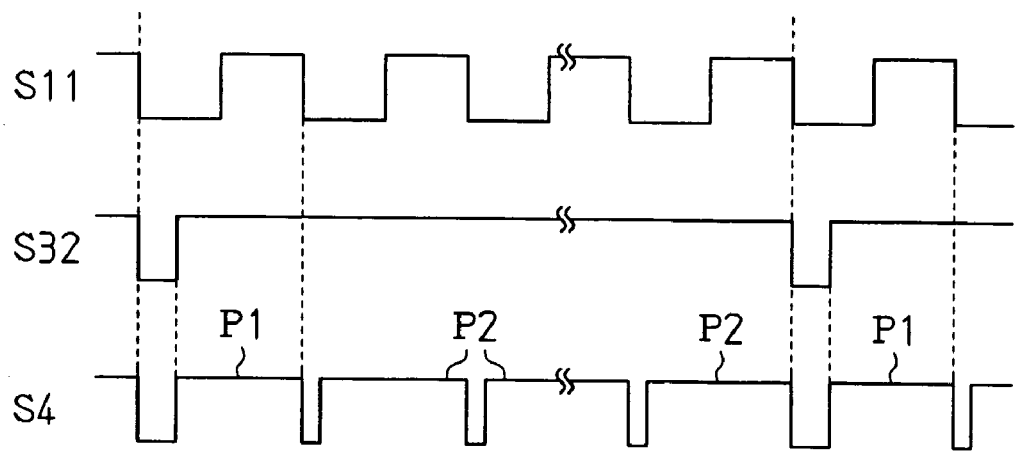
FIG. 4 is a diagram showing the waveform of the charging time setting circuit in the DC/DC converter of FIG. 2.

In the first embodiment, the signal synthesizing circuit 53 is an AND circuit including a first input terminal for receiving the pulse signal S3 from the PWM comparison circuit 42 and a second input terminal for receiving a pulse signal S32 from the pulse width setting circuit 52. The signal synthesizing circuit 53 logically synthesizes the two pulse signals S3 and S31 to generate the adjusted pulse signal S4. Referring to FIG. 4, the adjusted pulse signal S4 includes pulses P1, which are generated every predetermined number of pulses and have adjusted widths, and pulses P2, which have widths that are not adjusted. The pulse widths of these pulses P1 and P2 correspond to the period during which the main transistor T1 in inactivated (period during which the synchronization transistor T2 is activated). The DC/DC converter 32 of the first embodiment ensures the charging time (i.e., charging voltage) of the boot capacitor C2 by adjusting the pulse width of the pulse P1 as described above.

The DC/DC converter 32 of the first embodiment has the advantages described below.

(1) The control circuit 40 includes the charging time setting circuit 44 that adjusts the activation and inactivation time of the main transistor T1 and the synchronization transistor T2 to ensure the charging time of the capacitor C2. The adjustment of the activation and inactivation time of the transistors T1 and T2 supplies the gate of the main transistor T1 with sufficient voltage. Accordingly, the DC/DC converter 32 decreases the ON resistance of the main transistor T1 without decreasing the oscillation frequency of the oscillation circuit 43. Further, the efficiency is improved.

(2) The charging time setting circuit 44, which is configured as described above, includes the pulse generation circuit 51, which generates a pulse for every predetermined number of the reference pulse signals S11, the pulse width setting circuit 52, which sets the widths of the pulses generated by the pulse generation circuit 51 in accordance with the charging time, and the signal synthesizing circuit 53, which generates the adjusted pulse signal S4 by synthesizing the pulse signal S3 with the signal S32 having a pulse width set by the pulse width setting circuit 52. In this manner, the DC/DC converter 32 adjusts the pulse widths of the first and second drive signals SG11 and SG12 provided to the transistors T1 and T2 to ensure the charging time of the capacitor C2.

[Second Embodiment]

A DC/DC converter 70 according to a second embodiment of the present invention will now be discussed with reference to FIG. 6.

Figure 6:
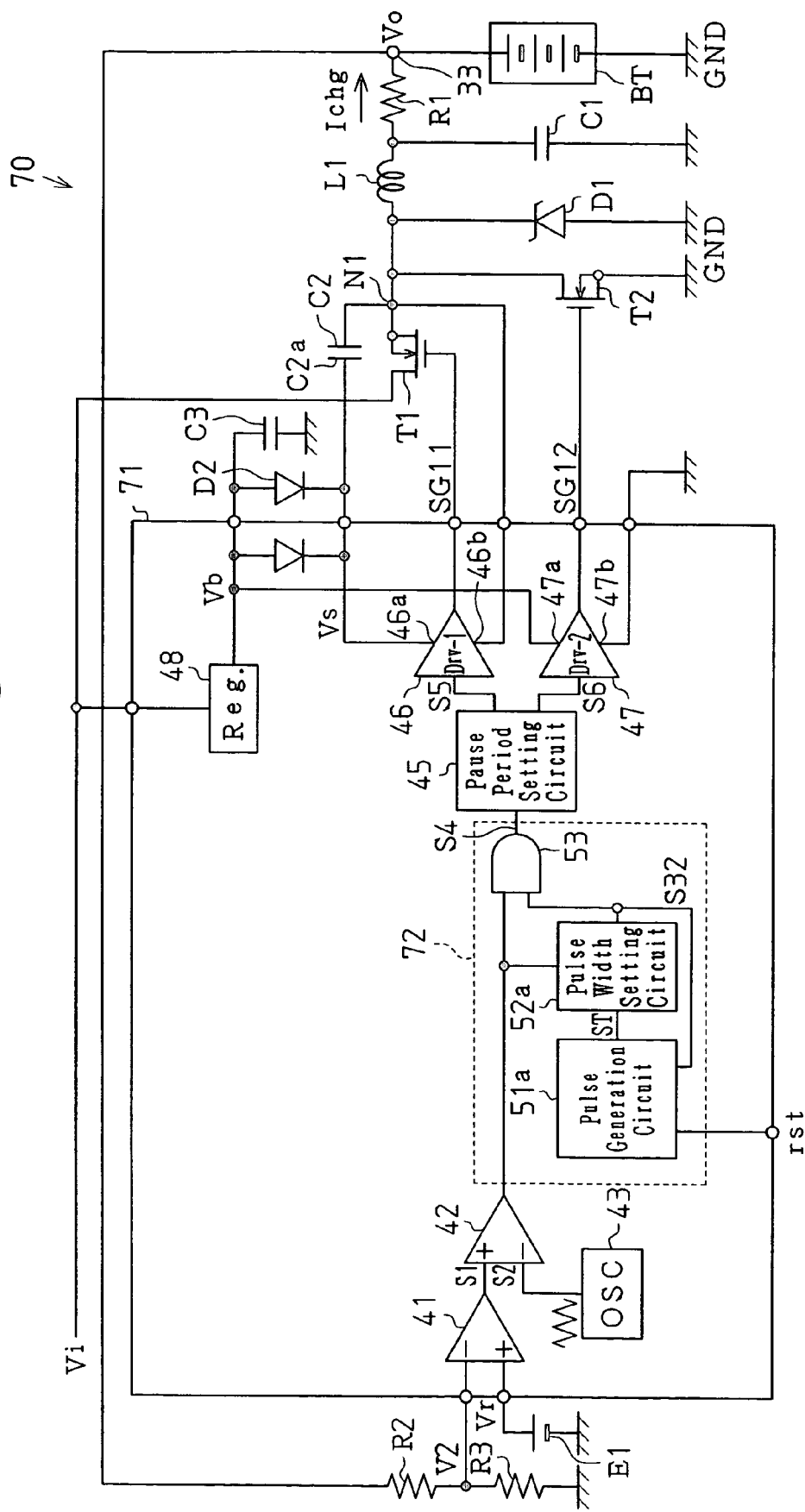
FIG. 6 is a schematic block circuit diagram of a DC/DC converter according to a second embodiment of the present invention.

FIG. 6 is a schematic block circuit diagram of the DC/DC converter 70.

As shown in FIG. 6, the DC/DC converter 70 includes a control circuit 71, a main transistor T1, a synchronization transistor T2, and a boot capacitor C2, which are all configured on the same chip of a semiconductor integrated circuit substrate.

The control circuit 71 includes an error amplification circuit 41, a PWM comparison circuit 42, an oscillation circuit 43, a charging time setting circuit 72, a pause period setting circuit 45, a first output circuit 46, a second output circuit 47, and a regulator 48.

The charging time setting circuit 72 includes a pulse generation circuit 51a, a pulse width setting circuit 52a, and a signal synthesizing circuit 53.

In the second embodiment, the pulse generation circuit 51a is a timer circuit, which generates a time-up signal ST having a predetermined level (e.g., high level) whenever a predetermined time elapses and which provides the time-up signal ST to the pulse width setting circuit 52a. In the second embodiment, the pulse width setting circuit 52a is a one shot circuit, which generates a pulse signal S32 having a predetermined pulse width in response to the time-up signal ST from the pulse generation circuit 51a and which provides the pulse signal S32 to the signal synthesizing circuit 53 and the pulse generation circuit 51a. Further, the PWM comparison circuit 42 provides the pulse width setting circuit 52a with the pulse signal S3. The pulse width setting circuit 52a generates the pulse signal S32 in synchronism with the pulse signal S3 in accordance with the time-up signal ST. The signal synthesizing circuit 53 logically synthesizes the pulse signal. S32 from the pulse width setting circuit 52a and the pulse signal S3 from the PWM comparison circuit 42 to generate and provide the pause period setting circuit 45 with an adjusted pulse signal S4.

The pulse width setting circuit 52a returns the pulse signal S32 to the pulse generation circuit 51a. In response to the pulse signal S32, the pulse generation circuit 51a resets (e.g., lowers to low level) the time-up signal ST and restarts the time count.

The predetermined time for generating the time-up signal ST and the predetermined pulse width of the pulse signal S32 are set in accordance with the source-gate voltage of the transistor T1 (i.e., charging voltage of the boot capacitor C2) to decrease the ON resistance of the main transistor T1.

The DC/DC converter 70 of the second embodiment has the following advantages.

The pulse generation circuit 51a configures a timer circuit. Accordingly, the charging time of the capacitor C2 is sufficiently ensured for every predetermined time regardless of the oscillation frequency of the oscillation circuit 43.

[Third Embodiment]

A DC/DC converter 80 according to a third embodiment of the present invention will now be discussed with reference to FIG. 7.

Figure 7:
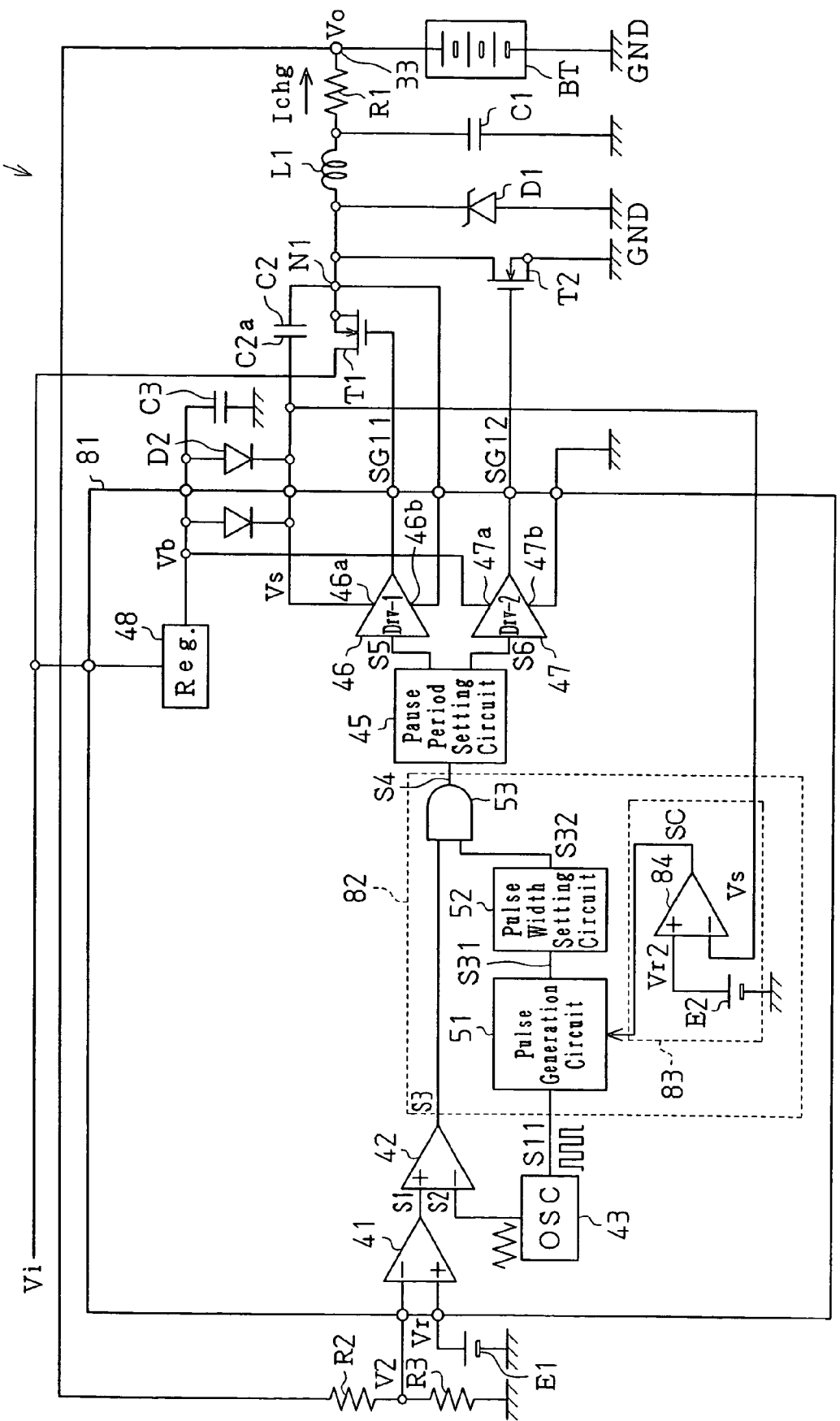
FIG. 7 is a schematic block circuit diagram of a DC/DC converter according to a third embodiment of the present invention.

As shown in FIG. 7, the DC/DC converter 70 includes a control circuit 81, a main transistor T1, a synchronization transistor T2, and a boot capacitor C2, which are all configured on the same chip of a semiconductor integrated circuit substrate.

The control circuit 81 includes an error amplification circuit 41, a PWM comparison circuit 42, an oscillation circuit 43, a charging time setting circuit 82, a pause period setting circuit 45, a first output circuit 46, a second output circuit 47, and a regulator 48.

The charging time setting circuit 82 includes a pulse generation circuit 51, a pulse width setting circuit 52, a signal synthesizing circuit 53, and a charge determination circuit 83.

The charge determination circuit 83 detects the voltage Vs at the terminal C2a of the capacitor C2 and determines whether the voltage Vs is greater than a predetermined voltage. The charge determination circuit 83 provides the pulse generation circuit 51 with the control signal SC at a predetermined level (e.g., high level) when the voltage Vs reaches a predetermined value. In response to the control signal SC having a predetermined level (high level), the pulse generation circuit 51 counts the pulses of the reference pulse signal S11 from the oscillation circuit 43. When the control signal SC goes low, the pulse generation circuit 51 stops counting the pulses. In this manner, the charge determination circuit 83 operates the pulse generation circuit 51 when the voltage Vs is less than a predetermined value.

More specifically, the charge determination circuit 83 includes a reference power supply E2 and a comparator 84. The comparator 84 includes an inverting input terminal connected to the terminal C2a of the boot capacitor C2 and a non-inverting input terminal for receiving reference voltage Vr2 (predetermined voltage) from the reference power supply E2. The comparator 84 compares the voltage Vs at the terminal C2a with the reference voltage Vr2. When the voltage Vs is lower than the reference voltage Vr2, the comparator 84 generates the control signal SC at a predetermined level (in the third embodiment, high level).

The pulse generation circuit 51 is configured in the same manner as in the first embodiment (refer to FIG. 3). In response to the high control signal SC, the pulse generation circuit 51 counts the pulses of the reference pulse signal S11. Accordingly, the charging time setting circuit 82 generates the adjusted pulse signal S4 by adjusting the pulse width of the pulse signal S3 when the voltage Vs is lower than the reference voltage Vr2. Further, the charging time setting circuit 82 generates the adjusted pulse signal S4 with substantially the same pulse width as the pulse signal S3 when the voltage Vs is higher than the reference voltage Vr2.

The DC/DC converter 80 of the third embodiment has the following advantages.

The charge determination circuit 83 generates the control signal SC based on the voltage Vs at the terminal C2a of the capacitor C2. Accordingly, when the voltage Vs at the terminal C2a is sufficiently high, the charging time setting circuit 82 does not adjust the pulse width of the first drive signal SG11. Thus, the adjustment of the pulse width is performed efficiently.

[Fourth Embodiment]

A DC/DC converter 90 according to a fourth embodiment of the present invention will now be discussed with reference to FIG. 8.

Figure 8:
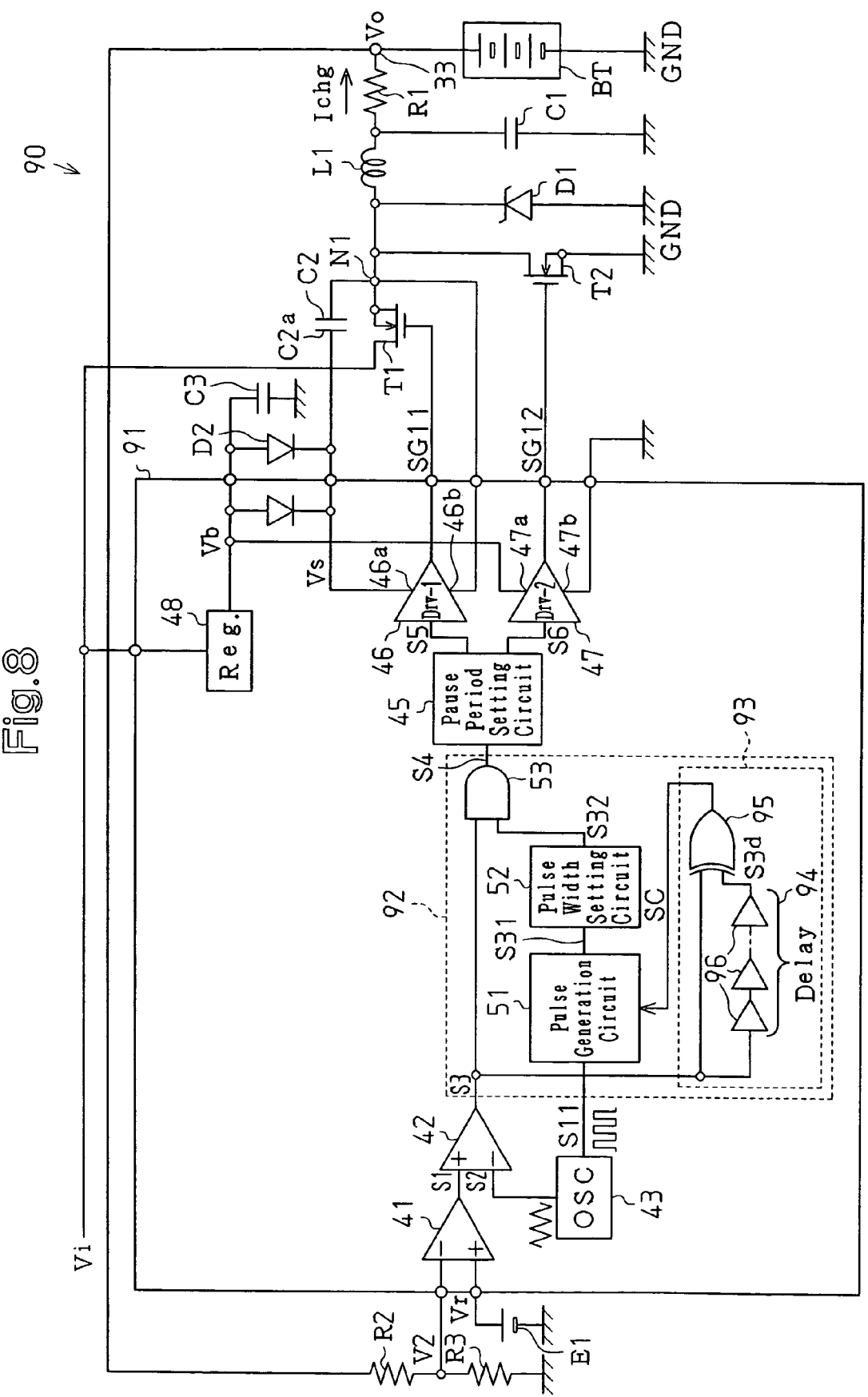
FIG. 8 is a schematic block circuit diagram of a DC/DC converter according to a fourth embodiment of the present invention.

As shown in FIG. 8, the DC/DC converter 90 includes a control circuit 91, a main transistor T1, a synchronization transistor T2, and a boot capacitor C2, which are all configured on the same chip of a semiconductor integrated circuit substrate.

The control circuit 91 includes an error amplification circuit 41, a PWM comparison circuit 42, an oscillation circuit 43, a charging time setting circuit 92, a pause period setting circuit 45, a first output circuit 46, a second output circuit 47, and a regulator 48.

The charging time setting circuit 92 includes a pulse generation circuit 51, a pulse width setting circuit 52, a signal synthesizing circuit 53, and a charge determination circuit 93.

The charge determination circuit 93 receives the pulse signal S3 from the PWM comparison circuit 42, monitors the pulse width of the pulse signal S3, and determines whether the pulse width is greater than or equal to a predetermined value. The charge determination circuit 93 provides the pulse generation circuit 51 with a control signal SC having a predetermined level (e.g., high level) when the pulse width of the pulse signal S3 is less than a predetermined value. In response to the control signal SC having a predetermined level (high level), the pulse generation circuit 51 counts the pulses of the reference pulse signal S11 from the oscillation circuit 43. When the control signal SC goes low, the pulse generation circuit 51 stops counting the pulses of the reference pulse signal S11. In this manner, the charge determination circuit 93 checks whether the pulse width of the pulse signal S3 is less than a predetermined value and operates the pulse generation circuit 51 when the pulse width is less than the predetermined value.

More specifically, the charge determination circuit 93 includes a delay circuit 94 and an EOR (exclusive OR) circuit 95. In the fourth embodiment, the delay circuit 94 includes a plurality of series-connected buffer circuits 96. The delay circuit 94 delays the pulse signal S3 from the PWM comparison circuit 42 to generate a delayed pulse signal S3d. The EOR circuit 95 includes a first input terminal for receiving the pulse signal S3 and a second input terminal for receiving the delayed pulse signal S3d. The EOR circuit 95 performs an exclusive OR operation on the pulse signal S3 and the delayed pulse signal S3d to generate the control signal SC and provides the control signal SC to the pulse generation circuit 51.

The DC/DC converter 90 of the fourth embodiment has the following advantages.

The charge determination circuit 93 generates the control signal SC based on the pulse width of the pulse signal S3. Accordingly, the control signal SC is generated when charging is necessary. Further, when charging is unnecessary, the pulse width of the first drive signal SG11 is not adjusted. This prevents efficiency from decreasing.

[Fifth Embodiment]

A DC/DC converter 100 according to a fifth embodiment of the present invention will now be discussed with reference to FIG. 9.

Figure 9:
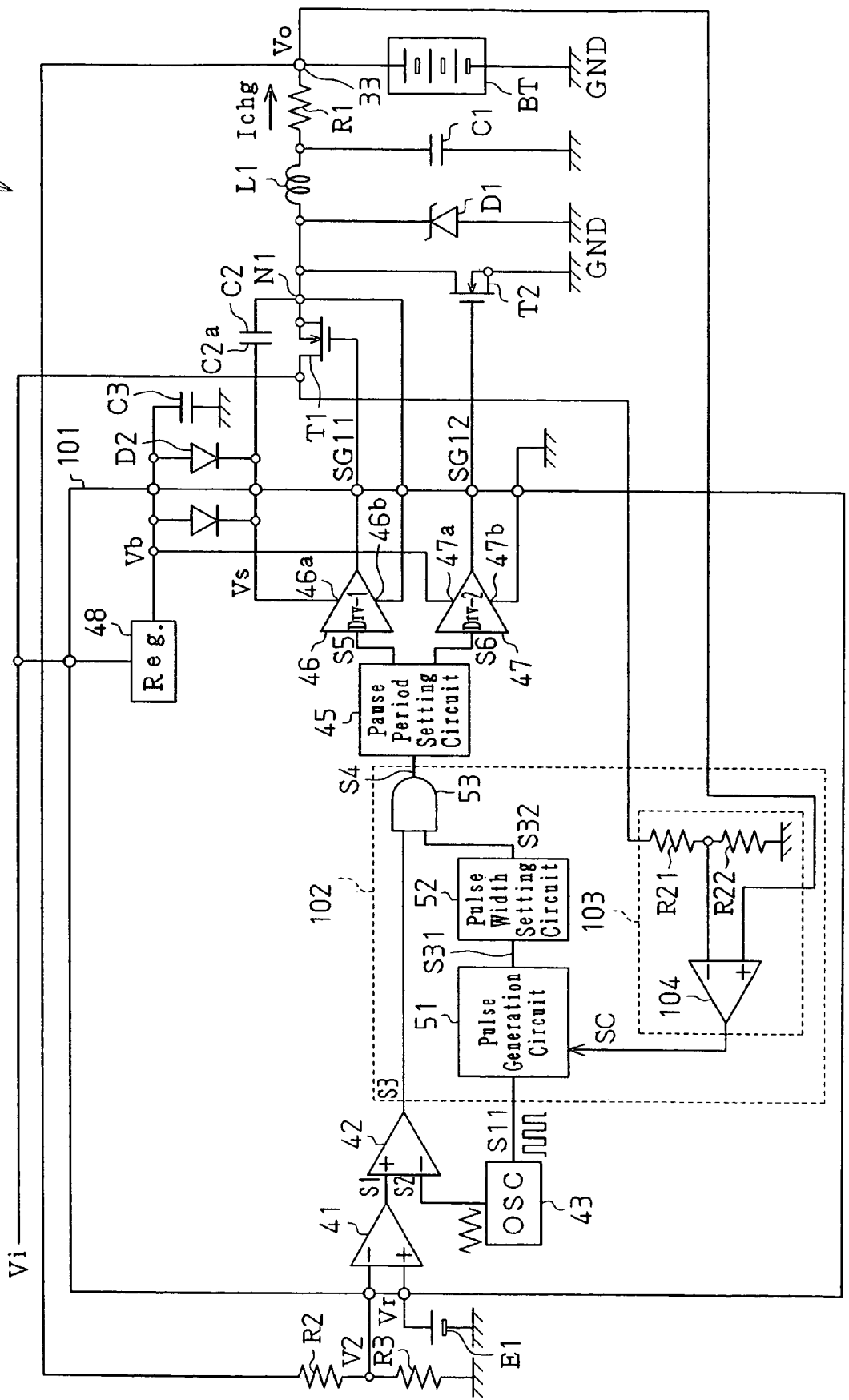
FIG. 9 is a schematic block circuit diagram of a DC/DC converter according to a fifth embodiment of the present invention.

As shown in FIG. 9, the DC/DC converter 100 includes a control circuit 101, a main transistor T1, a synchronization transistor T2, and a boot capacitor C2, which are all configured on the same chip of a semiconductor integrated circuit substrate.

The control circuit 101 includes an error amplification circuit 41, a PWM comparison circuit 42, an oscillation circuit 43, a charging time setting circuit 102, a pause period setting circuit 45, a first output circuit 46, a second output circuit 47, and a regulator 48.

The charging time setting circuit 102 includes a pulse generation circuit 51, a pulse width setting circuit 52, a signal synthesizing circuit 53, and a charge determination circuit 103.

The charge determination circuit 103 monitors the input voltage Vi and the output voltage Vo, determines whether or not adjustment of the pulse width is necessary, and generates the control signal SC based on the determination result. The charge determination circuit 103 includes two resistors R21 and R22 and a comparator 104. The resistors R21 and R22 are connected in series between the drain of the transistor T1 (i.e., input voltage Vi) and ground GND. The two resistors R21 and R22 configure a voltage dividing resistor. The resistors R21 and R22 divide the input voltage Vi to generate a divisional voltage V3 at the node between the resistors R21 and R22. The comparator 104 includes an inverting input terminal for receiving the divisional voltage V3 and a non-inverting input terminal for receiving the output voltage Vo of the output terminal 33. The comparator 104 compares the output voltage Vo and the divisional voltage V3. When the output voltage Vo is less than the divisional voltage V3 (related to the input voltage Vi), the comparator 104 generates and provides the control signal SC to the pulse generation circuit 51 to adjust the pulse width of the adjusted pulse signal S4.

The DC/DC converter 100 of the fifth embodiment has the following advantage.

The charge determination circuit 103 compares the input voltage Vi and the output voltage Vo to generate the control signal SC. Accordingly, the control signal SC is generated when charging is necessary. Further, when charging is unnecessary, the pulse width of the first drive signal SG11 is not adjusted. This prevents efficiency from decreasing.

[Sixth Embodiment]

A DC/DC converter 110 according to a sixth embodiment of the present invention will now be discussed with reference to FIGS. 10, 11A, and 11B.

Figure 10:
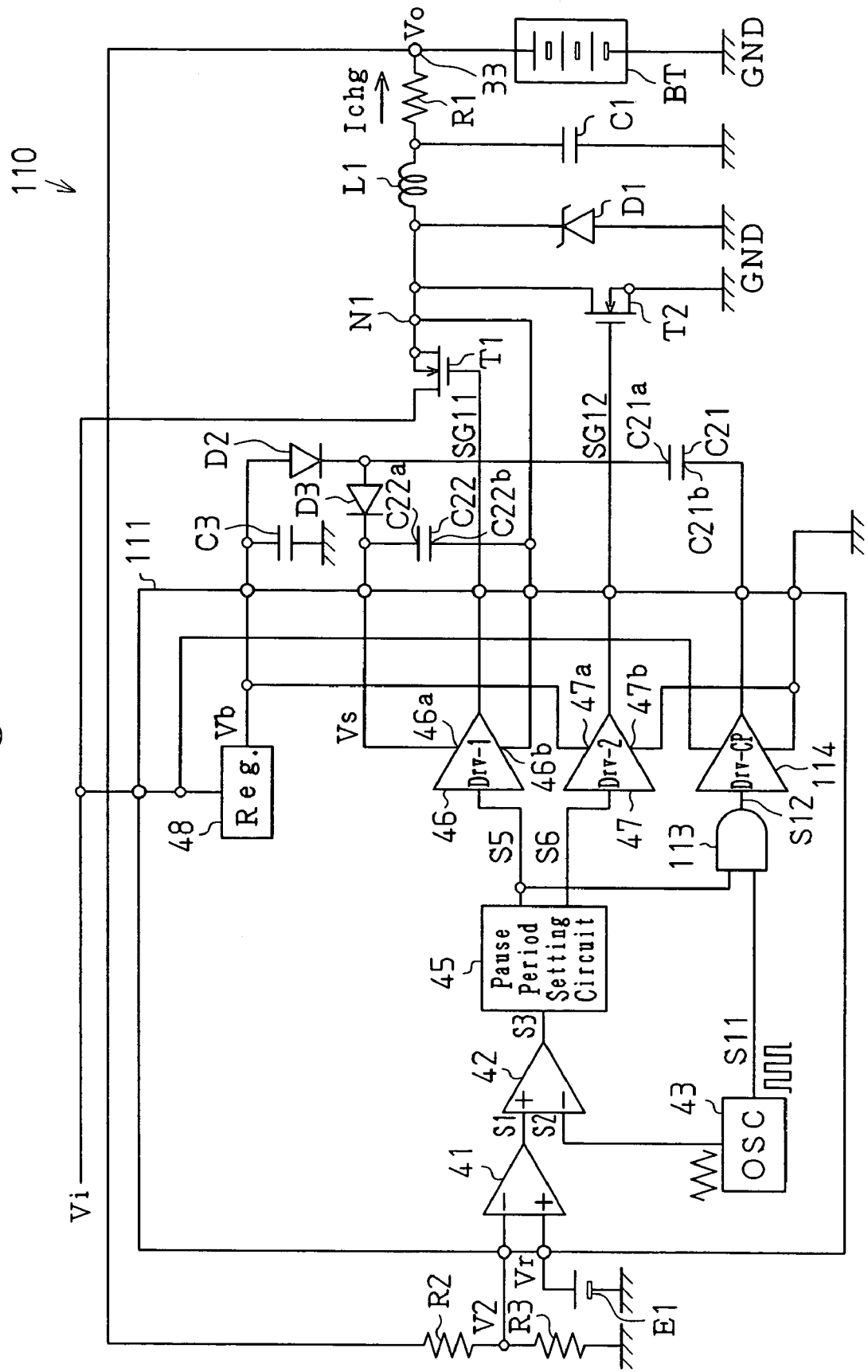
FIG. 10 is a schematic block circuit diagram of a DC/DC converter according to a sixth embodiment of the present invention.

As shown in FIG. 10, the DC/DC converter 110 includes a control circuit 111, a main transistor T1, a synchronization transistor T2, and a charge capacitor C21, which are all configured on the same chip of a semiconductor integrated circuit substrate.

The control circuit 111 includes an error amplification circuit 41, a PWM comparison circuit 42, an oscillation circuit 43, a pause period setting circuit 45, a first output circuit 46, a second output circuit 47, a regulator 48, an AND circuit 113, and a third output circuit 114.

The AND circuit 113 includes a first input terminal for receiving the reference pulse signal S11 from the oscillation circuit 43 and a second input terminal for receiving the first control signal S5 from the pause period setting circuit 45. The AND circuit 113 performs an AND operation on the reference pulse signal S11 and the first control signal S5 to generate and provide a pulse signal S12 to the third output circuit 114.

The drive voltage of the third output circuit 114 is the input voltage Vi. The third output circuit 114 amplifies the pulse signal S12 of the AND circuit 113 and provides the amplified pulse signal to the capacitor C21.

The first terminal 21a of the charge capacitor C21 is connected to the cathode of the diode D2. The second terminal 21b of the capacitor C21 is connected to the output terminal of the third output circuit 114. The anode of the diode D2 is connected to the regulator 48.

The cathode of the diode D2 is connected to the anode of the diode D3. The cathode of the diode D3 is connected to the power supply terminal 46a of the first output circuit 46. The cathode of the diode D3 is connected to the first terminal C22a of the capacitor C22. The second terminal C22b of the capacitor C22 is connected to the node N1.

The operation of the DC/DC converter 110 configured in the above manner will now be discussed.

Figure 11A:
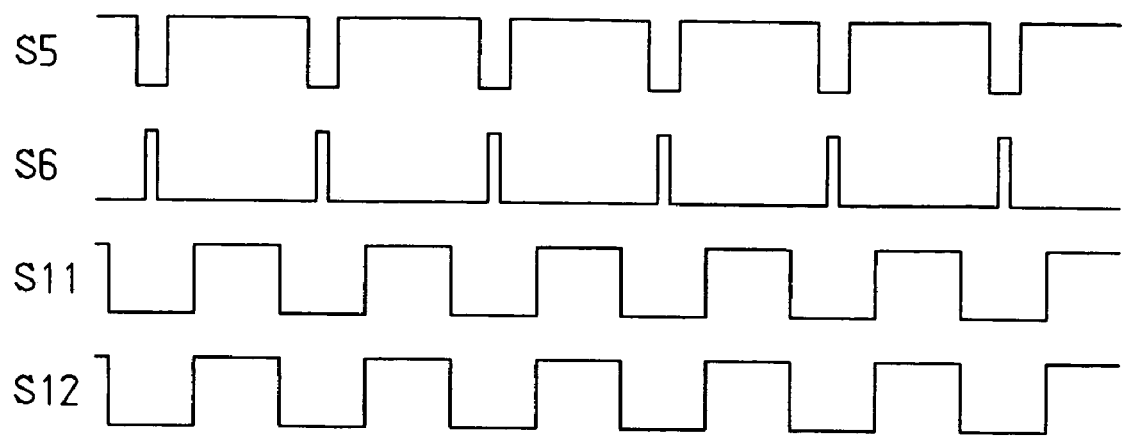
FIGS. 11A and 11B are waveform diagrams of the DC/DC converter of FIG. 10.

Referring to FIG. 11A, when the ON duty ratio of the first control signal S5 is greater than the reference pulse signal S1 (e.g., the ON duty ratio of the first control signal S5 being 50% when the ON duty ratio of the reference pulse signal S11 is greater than 50%), the AND circuit 113 generates the pulse signal S12, which has substantially the same waveform as the reference pulse signal S11. The third output circuit 114 pumps the capacitor C21 in accordance with the pulse signal S12. This stores charge in the capacitor C21. When the capacitor C21 is charged, the charge is stored in the capacitor C22 via the diode D3.

More specifically, when the pulse signal S12 provided to the third output circuit 114 has a low level, the regulator 48 stores charge in the capacitor C22 via the diodes D2 and D3 and stores charge in the capacitor C21 via the diode D2. In this state, the voltage at the first terminal C22a of the capacitor C22 and the voltage at the first terminal C21a of the capacitor C21 are the regulator output voltage Vb.

Subsequently, the pulse signal S12 provided to the third output circuit 114 goes high. As a result, the pumping operation of the third output circuit 114 causes the voltage at the second terminal C21b of the charge capacitor C21 to be at the level of the input voltage Vi. Accordingly, the voltage at the first terminal C21a of the capacitor C21 is set at a (Vb+Vi) level. Simultaneously, the voltages at the high potential power supply terminal 46a of the first output circuit 46 and the first terminal C22a of the capacitor C22 are also set at the (Vb+Vi) level when the transistor T1 is activated since the voltage at the second terminal C22b of the capacitor C22 is set at the level of the input voltage Vi. In other words, the potential difference between the power supply terminals 46a and 46b of the first output circuit 46 is set at Vb. The first output circuit 46, which is operated in accordance with the voltage supplied to the power supply terminals 46a and 46b, activates the main transistor T1. Accordingly, the ON resistance of the main transistor T1 is small. This prevents the conversion efficiency from decreasing.

Since the third output circuit 114 and the capacitor C21 supply voltage Vs that is sufficiently higher than the input voltage Vi (in the sixth embodiment Vs=Vb+Vi), the oscillation frequency of the oscillation circuit 43 does not have to be changed. Thus, a choke coil L1 corresponding to high frequencies may be used. Further, the DC/DC converter 110 may be applied for higher frequencies and the area occupied by externally connected devices (coil L1) may be decreased.

Figure 11B:
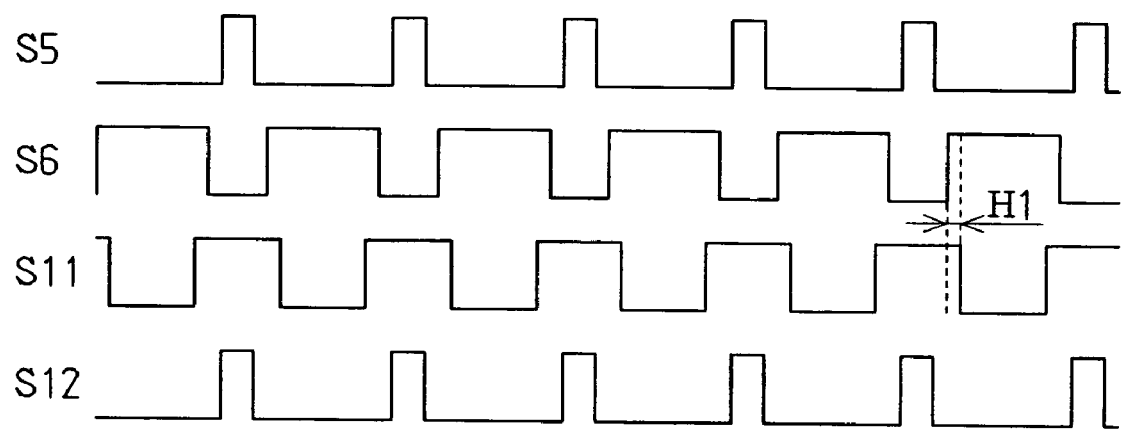

Referring to FIG. 11B, when the ON duty ratio of the first control signal S5 is less than the reference pulse signal S1 (e.g., the ON duty ratio of the first control signal S5 being 50% when the ON duty ratio of the reference pulse signal S11 is less than 50%), the AND circuit 113 generates the pulse signal S12, which has substantially the same waveform as the first control signal S5. The third output circuit 114 pumps the capacitor C21 in accordance with the pulse signal S12 and stores charge in the capacitor C21. When the capacitor C21 is charged, the charge is stored in the capacitor C22 via the diode D3. Then, the first output circuit 46, which is operated in accordance with the voltage Vs supplied in the same manner as described above, activates the main transistor T1.

Consideration will now be given to a case in which the AND circuit 113 is eliminated from the configuration of the sixth embodiment and the oscillation circuit 43 is directly connected to the third output circuit 114. In this case, the third output circuit 114 would perform pumping based on the reference pulse signal S11.

Due to the ON duty ratio of the first and second control signals S5 and S6, a period H1 exists during which the second control signal S6 and the reference pulse signal S11 are both high. During the period H1, the synchronization transistor T2 is activated. Thus, the potential at node N1, that is, the low potential power supply terminal 46b of the first output circuit 46, is equal to the ground GND level (0 volts). The third reference pulse signal S11, which is operated based on the reference pulse signal S1, sets the potential at the first terminal C21a of the capacitor C21 at the (Vb+Vi) level. Accordingly, the potential difference between the terminals 46a and 46b of the first output circuit 46 is (Vb+Vi). In this case, the first output circuit 46 must have an electric characteristic that resists the potential difference of (Vb+Vi).

As described above, the potential difference between the terminals 46a and 46b of the first output circuit 46 outside the period H1 is Vb. In addition, the potential difference between the terminals 47a and 47b of the second output circuit 47 is Vb.

Accordingly, when the AND circuit 113 is not connected between the oscillation circuit 43 and the third output circuit 114, the first output circuit 46 must have a higher voltage capacity. The area occupied by such a first output circuit 46 is greater than that having a low voltage capacity.

In the sixth embodiment, an AND operation is performed on the first control signal S5 and the reference pulse signal S11 to generate the pulse signal S12. Since the third output circuit 114 is operated in accordance with the pulse signal S12, the voltage capacity of the first output circuit 46 needs only to correspond to the potential difference Vb.

[Seventh Embodiment]

A DC/DC converter 120 according to a seventh embodiment of the present invention will now be discussed with reference to FIGS. 12 and 13.

Figure 12:
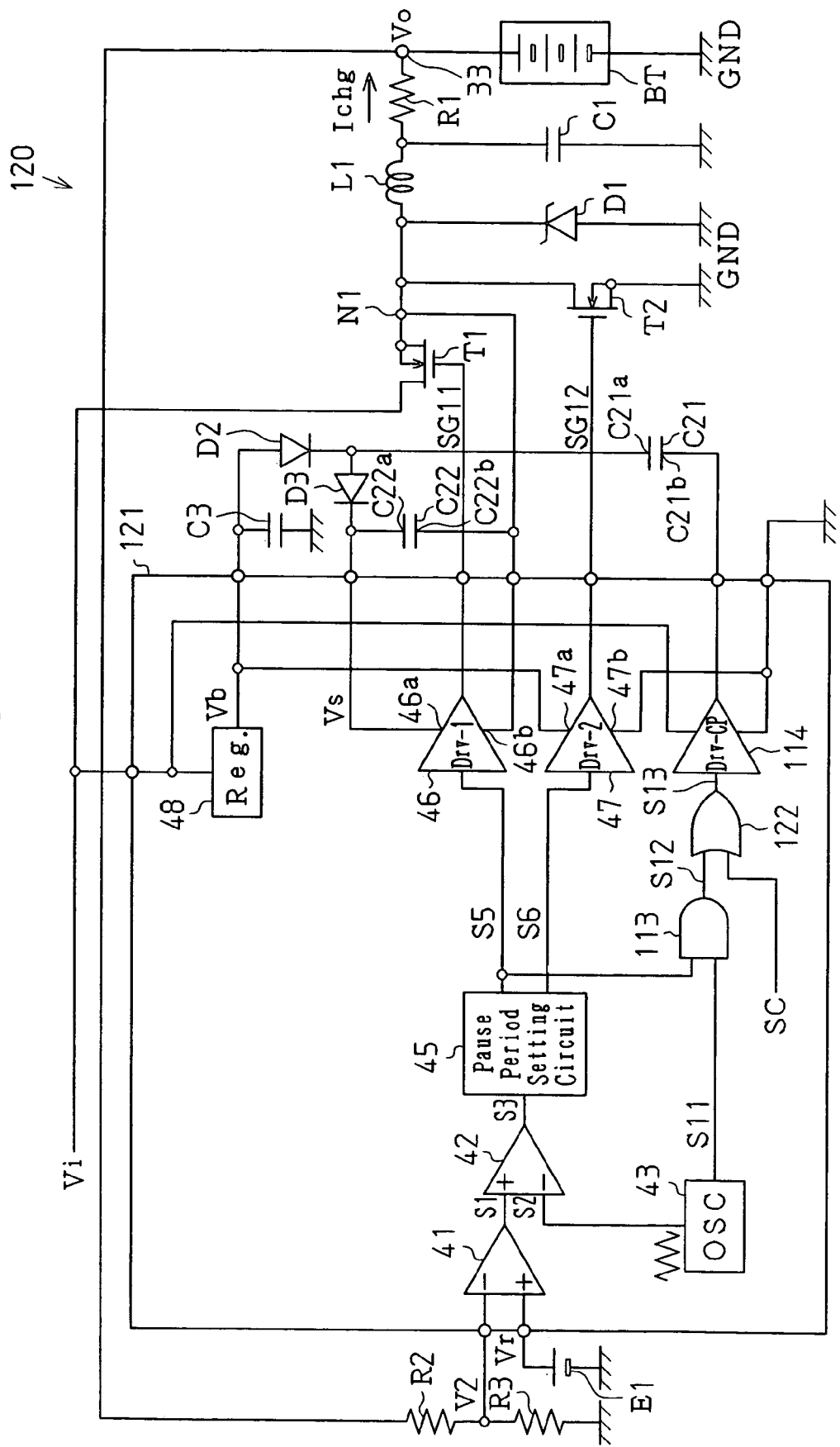
FIG. 12 is a schematic block circuit diagram of a DC/DC converter according to a seventh embodiment of the present invention.

As shown in FIG. 12, the DC/DC converter 120 includes a control circuit 121, a main transistor T1, a synchronization transistor T2, and a charge capacitor C21, which are all configured on the same chip of a semiconductor integrated circuit substrate.

The control circuit 121 includes an error amplification circuit 41, a PWM comparison circuit 42, an oscillation circuit 43, a pause period setting circuit 45, a first output circuit 46, a second output circuit 47, a regulator 48, an AND circuit 113, an OR circuit 122, and a third output circuit 114.

The AND circuit 113 includes a first input terminal for receiving the reference pulse signal S11 from the oscillation circuit 43 and a second input terminal for receiving the first control signal S5 from the pause period setting circuit 45. The AND circuit 113 performs an AND operation on the reference pulse signal S11 and the first control signal S5 to generate the pulse signal S12.

The OR circuit 122 includes a first input terminal for receiving the pulse signal S12 from the AND circuit 113 and a second input terminal for receiving the control signal SC. The control signal SC is the same as, for example, the control signal generated by the charge determination circuit 83 in the third embodiment. The OR circuit 122 performs an OR operation on the pulse signal S12 and the control signal SC to generate the pulse signal S13.

Figure 13:
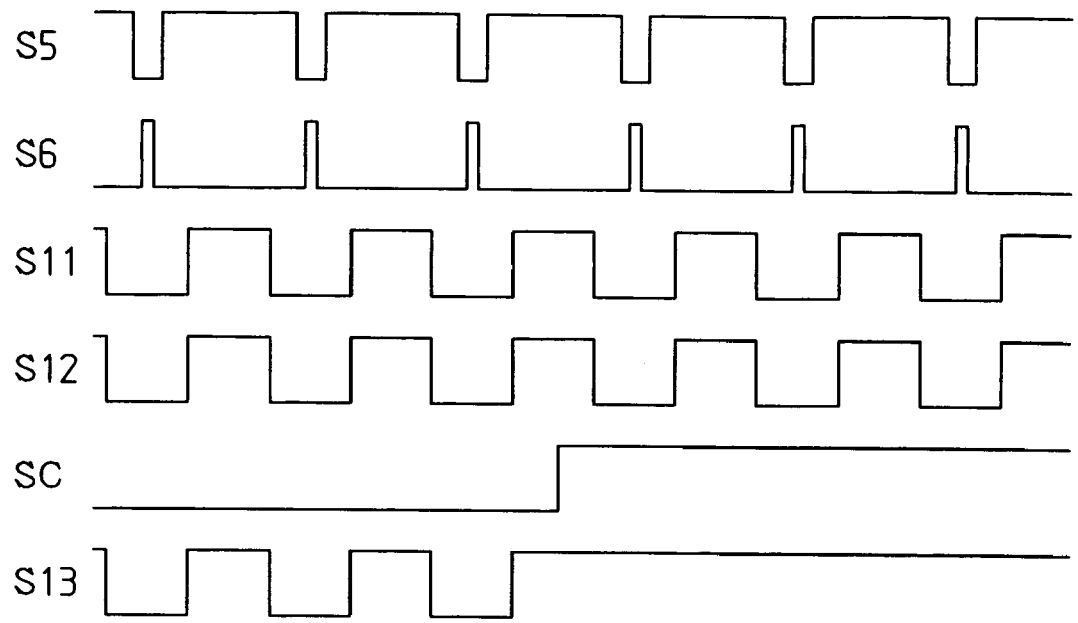
FIG. 13 is a waveform diagram of the DC/DC converter of FIG. 12.

Accordingly, referring to FIG. 13, the DC/DC converter 120 functions in the same manner as in the sixth embodiment when the control signal SC is provided to the OR circuit 122 at a low level. In accordance with the pulse signal S13 provided from the OR circuit 122, the third output circuit 114 pumps the charge capacitor C21. The first output circuit 46 uses the voltage Vs (Vi+Vb) at the terminal C22a of the capacitor C22 to activate the main transistor T1.

When the OR circuit 122 is provided with the high control signal SC, the OR circuit 122 provides the third output circuit 114 with the pulse signal S13 at a constant (high) level. In response to the pulse signal S13, the third output circuit 114 stops the pumping operation.

It should be apparent to those skilled in the art that the present invention may be embodied in many other specific forms without departing from the spirit or scope of the invention. Particularly, it should be understood that the present invention may be embodied in the following forms.

Figure 14:
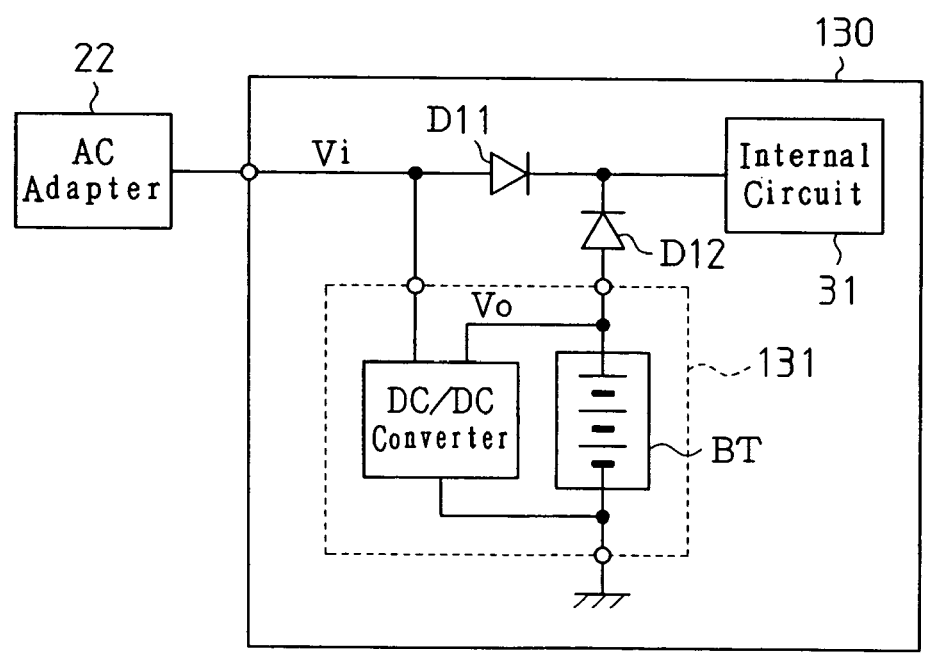
FIG. 14 is a schematic block diagram of an electronic device in a further embodiment of the present invention.

In the first embodiment, the electronic device 21 includes the DC/DC converter 32. However, the present invention is not limited to such a configuration, and the configuration of the electronic device may be changed as required. For example, referring to FIG. 14, the electronic device 130 may have a detachable battery pack 131, which includes the battery BT and a DC/DC converter. The DC/DC converter may be any one of the DC/DC converters 32, 70, 80, 90, 100, 110, or 120 of the above embodiments. Such a configuration provides a battery 131 and an electronic device 130 that improve the conversion efficiency of the input voltage Vi to the output voltage Vo.

In the DC/DC converter 32 of the first embodiment, the pulse generation circuit 51 generates one pulse of the pulse signal S31 for every four counted pulses of the reference pulse signal S11. However, the present invention is not restricted to such a configuration and the DC/DC converter 32 may be configured so that the count value for the pulses of the reference pulse signal S11 may be changed (e.g., so that one pulse of the pulse signal S31 is generated for every six counted pulses of the reference pulse signal S11).

In the first embodiment, the DC/DC converter 32 may be configured so that the pulse generation circuit 51 counts the pulses of the pulse signal S3.

In the second embodiment, the DC/DC converter 70 may be configured so that the timer value of the pulse generation circuit 51a is variable.

In the seventh embodiment, the control signal SC may be a control signal generated by the charge determination circuit 93 of the fourth embodiment, the control signal generated by the charge determination circuit 103 of the fifth embodiment, or a control signal provided from an external device.

The control circuits 40, 71, 81, 91, 101, 111, and 121 may be configured solely on the same chip of a semiconductor integrated circuit substrate.

The present examples and embodiments are to be considered as illustrative and not restrictive, and the invention is not to be limited to the details given herein, but may be modified within the scope and equivalence of the appended claims.

What is claimed is:

1. A synchronous rectification type DC/DC converter comprising:
    a main transistor;
    a synchronization transistor connected in series to the main transistor;
    a control circuit, connected to the main transistor and the synchronization transistor, for alternately activating the main transistor and the synchronization transistor for a predetermined activation time; and
    a capacitor, connected to the control circuit and charged when the synchronization transistor is activated, for supplying the control circuit with charge voltage used to activate the main transistor;
    the control circuit including a charging time setting circuit for setting the predetermined activation time of the main transistor and the synchronization transistor.

2. The DC/DC converter according to claim 1, wherein the charging time setting circuit generates a pulse signal having a pulse width that is adjusted to ensure that the capacitor is charged for a sufficient charging time, the control circuit using the pulse signal to control the main transistor and the synchronization transistor.

3. The DC/DC converter according to claim 2, wherein the charging time setting circuit adjusts the pulse width of the pulse signal so that the activation time of the synchronization transistor increases when the capacitor is not charged to a predetermined voltage.

4. The DC/DC converter according to claim 1, wherein the DC/DC converter generates output voltage in accordance with voltage generated by the activation and inactivation of the main transistor and the synchronization transistor, the control circuit including:
   an error amplification circuit for comparing the output voltage of the DC/DC converter with a reference voltage to generate an error signal;
   a comparison circuit, connected to the error amplification circuit, for comparing the error signal with a triangular wave signal to generate a comparison pulse signal having a pulse width that is in accordance with the comparison;
   a first output circuit, connected to the main transistor, for generating a first drive signal, provided to the main transistor, with a synthesized signal; and
   a second output circuit, connected to the synchronization transistor, for generating a second drive signal, provided to the synchronization transistors with the synchronized signal;
   the charging time setting circuit including:
   a pulse generation circuit for receiving a reference pulse signal and generating a first pulse signal having one pulse for every predetermined number of pulses of the received reference pulse signal;
   a pulse width setting circuit, connected to the pulse generation circuit, for generating a second pulse signal having a pulse width that is in accordance with the charging time of the capacitor by using the first pulse signal generated by the pulse generation circuit; and
   a signal synthesizing circuit, connected to the comparison circuit and the pulse width setting circuit, for generating the synthesized signal by synthesizing the comparison pulse signal of the comparison circuit with the second pulse signal of the pulse width setting circuit.

5. The DC/DC converter according to claim 4, wherein the control circuit includes an oscillation circuit, connected to the comparison circuit and the pulse generation circuit, for generating the triangular wave signal and the reference pulse signal.

6. The DC/DC converter according to claim 4, wherein the pulse generation circuit stops generating the first pulse signal in response to a control signal.

7. The DC/DC converter according to claim 6, wherein the charging time setting circuit includes a charge time determination circuit for determining whether the charging of the capacitor is sufficient and generates the control signal in accordance with the determination.

8. The DC/DC converter according to claim 7, wherein the charge determination circuit compares the voltage of the capacitor with the reference voltage to determine whether the charging of the capacitor is sufficient.

9. The DC/DC converter according to claim 7, wherein the charge determination circuit determines whether the charging of the capacitor is sufficient from the comparison pulse signal of the comparison circuit.

10. The DC/DC converter according to claim 7, wherein the charge determination circuit compares the output voltage of the DC/DC converter with input voltage of the DC/DC converter to determine whether charging of the capacitor is sufficient.

11. The DC/DC converter according to claim 1, wherein the DC/DC converter generates output voltage in accordance with voltage generated by the activation and inactivation of the main transistor and the synchronization transistor, the control circuit including:
    an error amplification circuit for comparing the output voltage of the DC/DC converter with a reference voltage to generate an error signal;
    a comparison circuit, connected to the error amplification circuit, for comparing the error signal with a triangular wave signal to generate a comparison pulse signal having a pulse width that is in accordance with the comparison;
    a first output circuit, connected to the main transistor, for generating a first drive signal, provided to the main transistor, with a synthesized signal; and
    a second output circuit, connected to the synchronization transistor, to generate a second drive signal, provided to the synchronization transistor, with the synchronized signal;
    the charging time setting circuit including:
    a pulse generation circuit for generating a first pulse signal having one pulse that appears whenever a predetermined time elapses;
    a pulse width setting circuit, connected to the pulse generation circuit, for generating a second pulse signal having a pulse width that is in accordance with the time the capacitor is charged by using the first pulse signal generated by the pulse generation circuit; and
    a signal synthesizing circuit, connected to the comparison circuit and the pulse width setting circuit, for generating the synthesized signal by synthesizing the comparison pulse signal of the comparison circuit with the second pulse signal of the pulse width setting circuit.

12. A synchronous rectification type DC/DC converter comprising:
    a main transistor;
    a synchronization transistor connected in series to the main transistor;
    a control circuit, connected to the main transistor and the synchronization transistor, for alternately activating the main transistor and the synchronization transistor for a predetermined activation time;
    a first capacitor, connected to the control circuit and charged when the synchronization transistor is activated, for supplying the control circuit with charge voltage used to activate the main transistor; and
    a second capacitor connected in series to the first capacitor;
    wherein the DC/DC converter generates output voltage in accordance with voltage generated by the activation and inactivation of the main transistor and the synchronization transistor, the control circuit including:
    an error amplification circuit for comparing the output voltage of the DC/DC converter with a reference voltage to generate an error signal;
    a comparison circuit, connected to the error amplification circuit, for comparing the error signal with a triangular wave signal to generate a comparison pulse signal having a pulse width that is in accordance with the comparison;

a pause period setting circuit, connected to the comparison circuit, for generating a first control signal and a second control signal in accordance with the comparison pulse signal of the comparison circuit so that the main transistor and the synchronization transistor are both inactivated during a predetermined period;

a first output circuit, connected to the pause period setting circuit and the main transistor, for generating a first drive signal, provided to the main transistor, with the first control signal;

a second output circuit, connected to the pause period setting circuit and the synchronization transistor, for generating a second drive signal, provided to the synchronization transistor, with the second control signal;

a signal synthesizing circuit, connected to the pause period setting circuit, for synthesizing the first control signal with a reference pulse signal to generate a synthesized signal; and a third output circuit, connected to the signal synthesizing circuit, for pumping the second capacitor in accordance with the synthesized signal of the signal synthesizing circuit.

13. A synchronous rectification type DC/DC converter comprising:

a main transistor;

a synchronization transistor connected in series to the main transistor;

a first output circuit, connected to the main transistor, for generating a first drive signal to drive the main transistor in accordance with the synthesized signal, the first output circuit having a power supply terminal;

a second output circuit, connected to the synchronization transistor, for generating a second drive signal to drive the synchronization transistor in accordance with the synthesized signal;

a capacitor connected to the power supply terminal of the first output circuit and to a node between the main transistor and the synchronization transistor;

an error amplification circuit for comparing the output voltage of the DC/DC converter with a reference voltage to generate an error signal;

a comparison circuit, connected to the error amplification circuit, for comparing the error signal with a triangular wave signal to generate a comparison pulse signal having a pulse width that is in accordance with the comparison;

a pulse generation circuit for generating a one shot pulse signal at a predetermined time interval;

a pulse width setting circuit, connected to the pulse generation circuit, for generating a setting pulse signal having a pulse width that is in accordance with the time the capacitor is charged by using the one shot pulse signal generated by the pulse generation circuit; and a signal synthesizing circuit, connected to the comparison circuit and the pulse width setting circuit, for generating the synthesized signal by synthesizing the comparison pulse signal of the comparison circuit with the setting pulse signal of the pulse width setting circuit.

14. A semiconductor device incorporating a DC/DC converter, the DC/DC converter comprising:

a main transistor;

a synchronization transistor connected in series to the main transistor;

a control circuit, connected to the main transistor and the synchronization transistor, for alternately activating the main transistor and the synchronization transistor for a predetermined activation time; and a capacitor, connected to the control circuit and charged when the synchronization transistor is activated, for supplying the control circuit with charge voltage used to activate the main transistor;

the control circuit including a charging time setting circuit for setting the predetermined activation time of the main transistor and the synchronization transistor.

15. The semiconductor device according to claim 14, wherein the charging time setting circuit generates a pulse signal having a pulse width that is adjusted to ensure that the capacitor is charged for a sufficient charging time, the control circuit using the pulse signal to control the main transistor and the synchronization transistor.

16. The semiconductor device according to claim 15, wherein the charging time setting circuit adjusts the pulse width of the pulse signal so that the activation time of the synchronization transistor increases when the capacitor is not charged to a predetermined voltage.

17. A semiconductor device incorporating a DC/DC converter, the DC/DC converter comprising:

a main transistor;

a synchronization transistor connected in series to the main transistor;

a control circuit, connected to the main transistor and the synchronization transistor, for alternately activating the main transistor and the synchronization transistor for a predetermined activation time;

a first capacitor, connected to the control circuit and charged when the synchronization transistor is activated, for supplying the control circuit with charge voltage used to activate the main transistor; and a second capacitor connected in series to the first capacitor;

wherein the DC/DC converter generates output voltage in accordance with voltage generated by the activation and inactivation of the main transistor and the synchronization transistor, the control circuit including:

an error amplification circuit for comparing the output voltage of the DC/DC converter with a reference voltage to generate an error signal;

a comparison circuit, connected to the error amplification circuit, for comparing the error signal with a triangular wave signal to generate a comparison pulse signal having a pulse width that is in accordance with the comparison;

a pause period setting circuit, connected to the comparison circuit, for generating a first control signal and a second control signal in accordance with the comparison pulse signal of the comparison circuit so that the main transistor and the synchronization transistor are both inactivated during a predetermined period;

a first output circuit, connected to the pause period setting circuit and the main transistor, for generating a first drive signal, provided to the main transistor, with the first control signal;

a second output circuit, connected to the pause period setting circuit and the synchronization transistor, for generating a second drive signal, provided to the synchronization transistor, with the second control signal;

a signal synthesizing circuit, connected to the pause period setting circuit, for generating a synthesized signal by synthesizing the first control signal with a reference pulse signal; and a third output circuit, connected to the signal synthesizing circuit, for pumping the second capacitor in accordance with the synthesized signal of the signal synthesizing circuit.

18. An electronic device incorporating a DC/DC converter, the DC/DC converter comprising:
a main transistor;
a synchronization transistor connected in series to the main transistor;
a control circuit, connected to the main transistor and the synchronization transistor, for alternately activating the main transistor and the synchronization transistor for a predetermined activation time; and
a capacitor, connected to the control circuit and charged when the synchronization transistor is activated, for supplying the control circuit with charge voltage used to activate the main transistor;
the control circuit including a charging time setting circuit for setting the predetermined activation time of the main transistor and the synchronization transistor.

19. A battery pack for functioning as a power supply of a device, the battery pack comprising:

a DC/DC converter for generating charge voltage;
a battery connected to the DC/DC converter and charged by the charge voltage supplied from the DC/DC converter;
the DC/DC converter including:
a main transistor;
a synchronization transistor connected in series to the main transistor;
a control circuit, connected to the main transistor and the synchronization transistor, for alternately activating the main transistor and the synchronization transistor for a predetermined activation time; and
a capacitor, connected to the control circuit and charged when the synchronization transistor is activated, for supplying the control circuit with charge voltage used to activate the main transistor;
the control circuit including a charging time setting circuit for setting the predetermined activation time of the main transistor and the synchronization transistor.

* * * * *